(12) United States Patent
Dongaonkar et al.

(10) Patent No.: US 11,500,887 B2
(45) Date of Patent: Nov. 15, 2022

(54) TECHNOLOGIES FOR TUNING PERFORMANCE AND/OR ACCURACY OF SIMILARITY SEARCH USING STOCHASTIC ASSOCIATIVE MEMORIES

(71) Applicant: Intel Corporation, Santa Clara, CA (US)

(72) Inventors: Sourabh Dongaonkar, Portland, OR (US); Jawad B. Khan, Portland, OR (US); Chetan Chauhan, Folsom, CA (US); Dipanjan Sengupta, Hillsboro, OR (US); Mariano Tepper, Portland, OR (US); Theodore Willke, Portland, OR (US); Richard L. Coulson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/227,045

(22) Filed: Apr. 9, 2021

(65) Prior Publication Data

US 2021/0224267 A1     Jul. 22, 2021

(51) Int. Cl.
| *G06F 16/24* | (2019.01) |
| *G06F 16/2458* | (2019.01) |
| *G06N 7/00* | (2006.01) |
| *G06F 16/21* | (2019.01) |
| *G06F 16/22* | (2019.01) |
| *G06F 16/248* | (2019.01) |

(52) U.S. Cl.
CPC ........ *G06F 16/2462* (2019.01); *G06F 16/217* (2019.01); *G06F 16/221* (2019.01); *G06F 16/248* (2019.01); *G06F 16/2468* (2019.01); *G06N 7/005* (2013.01)

(58) Field of Classification Search
CPC .................................................... G06F 16/2462
USPC ........................................................ 707/722
See application file for complete search history.

(56) References Cited

U.S. PATENT DOCUMENTS

| 2006/0101060 A1 | 5/2006 | Li et al. |
| 2019/0220202 A1 | 7/2019 | Khan et al. |
| 2019/0220735 A1* | 7/2019 | Sengupta .............. G06F 3/0659 |

OTHER PUBLICATIONS

Extended European Search Report for Patent Application No. 22160891.2, dated Jul. 7, 2022, 8 pages.

* cited by examiner

*Primary Examiner* — Syling Yen
(74) *Attorney, Agent, or Firm* — Compass IP Law PC

(57) ABSTRACT

Technologies for tuning performance and/or accuracy of similarity search using stochastic associative memories (SAM). Under a first subsampling approach, columns associated with set bits in a search key comprising a binary bit vector are subsampled. Matching set bits for the subsampled columns are aggregated on a row-wise basis to generate similarity scores, which are then ranked. A similar scheme is applied for all the columns with set bits in the search key and the results for top ranked rows are compared to evaluate a tradeoff between throughput boost versus lost accuracy. A second approach called continuous column read, and iterative approach is employed that continuously scores the rows as each new column read is complete. The similarity scores for an N-1 and Nth-1 iteration are ranked, a rank correlation is calculated, and a determination is made to whether the rank correlation meets or exceeds a threshold.

20 Claims, 19 Drawing Sheets

TECHNOLOGIES FOR TUNING PERFORMANCE AND/OR ACCURACY OF SIMILARITY SEARCH USING STOCHASTIC ASSOCIATIVE MEMORIES

BACKGROUND INFORMATION

Content-based similarity search, or simply similarity search, is a key technique that underpins machine learning (ML) and artificial intelligence (AI) applications. In performing a similarity search, query data, such as data indicative of an object (e.g., an image) is used to search a database to identify data indicative of similar objects (e.g., similar images). However, the sheer volume and richness of data used in large-scale similarity searches is an extremely challenging problem that is both compute and memory intensive.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
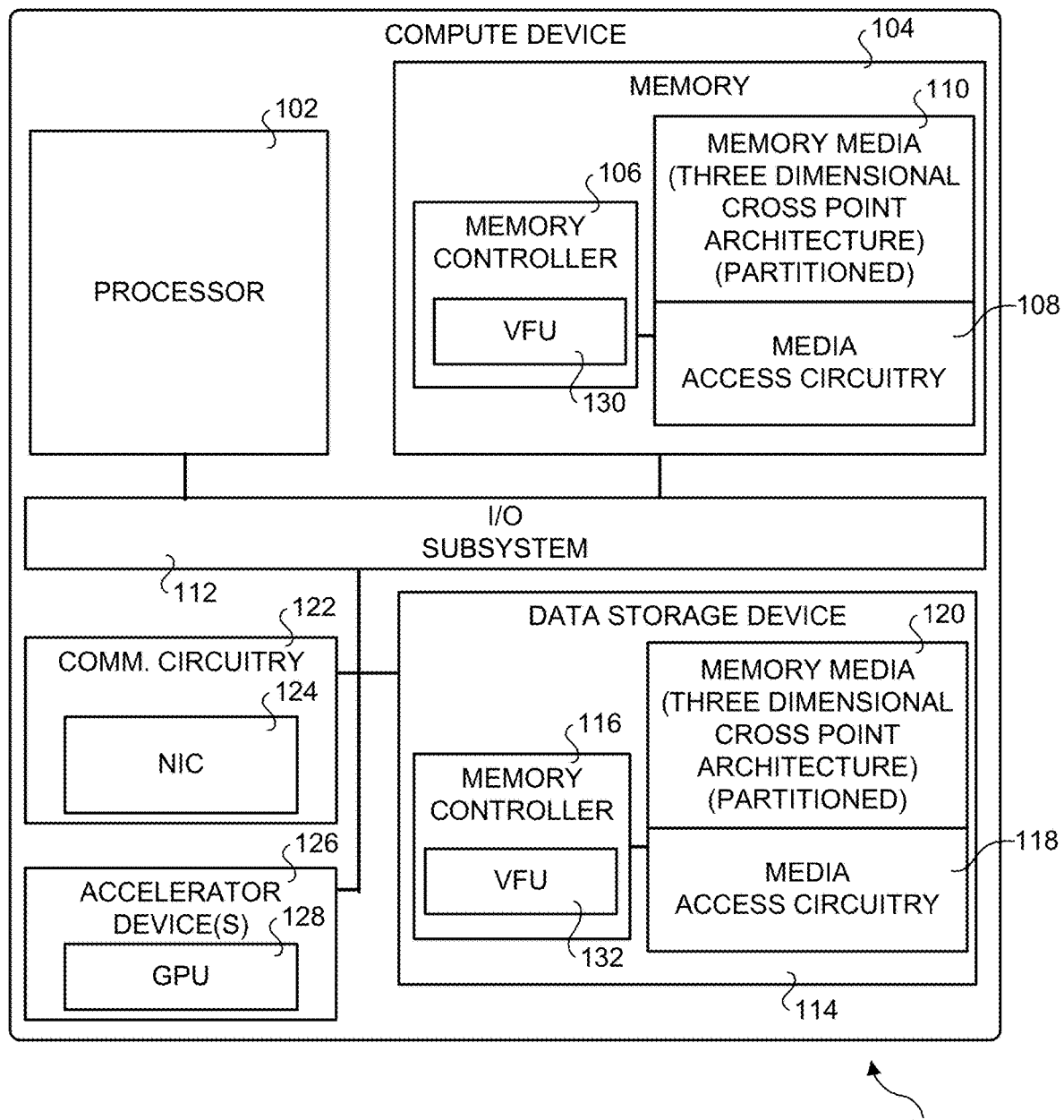
FIG. 1 is a simplified diagram of at least one embodiment of a compute device for performing similarity search acceleration using column-read enabled memory.

Embodiments of methods and apparatus associated with technologies for tuning performance and/or accuracy of similarity search using stochastic associative memories are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Stochastic associative memory (SAM) is a memory that is row and column addressable and supports both row- and column-wise reads with similar read latency. Three-dimensional (3D) cross-point memory is an example of SAM. This unique memory cell access capability enables vastly improved algorithms for similarity search, databases, and genomics, among others. For example, for some datasets column access allows use of new algorithms that access 1000× less data than those using conventional DRAM.

Under embodiments disclosed here, data representative of content to be searched, such as images, are encoded and stored as sparse bit vectors in column addressable memories such as stochastic associative memories to enable Stochastic Associative Search (SAS), which is a highly efficient and fast way of searching through a very large database of records (order of Billions) and finding similar records to a given query record (search key). The embodiments also employ techniques for tuning similarity searches to obtain a desired throughput vs. accuracy tradeoff.

FIG. 1 shows an exemplary compute device 100 for performing similarity search acceleration using stochastic associative memory in accordance with embodiments disclosed herein. Compute device 100 includes a processor 102, a memory 104, an input/output (I/O) subsystem 112, a data storage device 114, communication circuitry 122, and one or more optional accelerator devices 126. Memory 104 includes a memory controller 106 coupled to media access circuitry 108 used to access memory media 110. Data storage device 114 includes a memory controller 116 coupled to media access circuitry 118 used to access memory media 120. Generally, media access circuitry 108 and 118 comprises circuitry or a device configured to access and operate on data in the corresponding memory media 110 and 120, respectively.

In addition to the selected components shown, compute device 100 may include other or additional components, such as those commonly used by computers (e.g., a display, peripheral devices, etc.). In some embodiments, one or more of the illustrative components may be incorporated in, or otherwise form a portion of, another component.

Generally, the term "memory," as used herein in reference to performing similarity search acceleration, may refer to the memory in a memory device, such as memory 104, and/or may refer to memory in data storage devices, such as data storage device 114, unless otherwise specified. As explained in in further detail below, media access circuitry 108, 118 connected to a corresponding memory media 110, 120 (e.g., any device or material that data is written to and read from) may access (e.g., read) individual columns (e.g., bits) of vectors for use in performing similarity searches using SAS. As such, the memory operates as a "stochastic associative memory" (e.g., is designed to enable the efficient performance of stochastic associative searches).

Memory media 110, in the illustrative embodiment, has a three-dimensional cross-point architecture that has data access characteristics that differ from other memory architectures (e.g., dynamic random access memory (DRAM)), such as enabling access to one bit per tile and incurring latencies between reads or writes to the same partition or other partitions. Media access circuitry 108 is configured to make efficient use (e.g., in terms of power usage and speed) of the architecture of the memory media 110, such as by accessing multiple tiles in parallel within a given partition. In some embodiments, the media access circuitry 108 may utilize scratch pads (e.g., relatively small, low latency memory) to temporarily retain and operate on data read from the memory media 110 and broadcast data read from one partition to other portions of the memory 104 to enable calculations (e.g., matrix operations) to be performed in parallel within the memory 104. Additionally, in the illustrative embodiment, instead of sending read or write requests to the memory 104 to access matrix data, the processor 102 may send a higher-level request (e.g., a request for a macro operation, such as a request to return a set of N search results based on a search key). As such, many compute operations, such as artificial intelligence operations (e.g., stochastic associative searches) can be performed in memory (e.g., in the memory 104 or in the data storage device 114), with minimal usage of the bus (e.g., the I/O subsystem 112) to transfer data between components of the compute device 100 (e.g., between the memory 104 or data storage device 114 and the processor 102).

In some embodiments media access circuitry 108 is included in the same die as memory media 110. In other embodiments, media access circuitry 108 is on a separate die but in the same package as memory media 110. In yet other embodiments, media access circuitry 108 is in a separate die and separate package but on the same dual in-line memory module (DIMM) or board as memory media 110.

Processor 102 may be embodied as any device or circuitry (e.g., a multi-core processor(s), a microcontroller, or other processor or processing/controlling circuit) capable of performing operations described herein, such as executing an application (e.g., an artificial intelligence related application that may utilize stochastic associative searches). In some embodiments, processor 102 may be embodied as, include, or be coupled to a field-programmable gate array (FPGA), an application specific integrated circuit (ASIC), reconfigurable hardware or hardware circuitry, or other specialized hardware to facilitate performance of the functions described herein.

Memory 104, which may include a non-volatile memory in some embodiments (e.g., a far memory in a two-level memory scheme), includes memory media 110 and media access circuitry 108 (e.g., a device or circuitry, such as a processor, application specific integrated circuitry (ASIC), or other integrated circuitry constructed from complementary metal-oxide-semiconductors (CMOS) or other materials) underneath (e.g., at a lower location) and coupled to the memory media 110. Media access circuitry 108 is also connected to memory controller 106, which may be embodied as any device or circuitry (e.g., a processor, a co-processor, dedicated circuitry, etc.) configured to selectively read from and/or write to the memory media 110 in response to corresponding requests (e.g., from the processor 102 which may be executing an artificial intelligence related application that relies on stochastic associative searches to recognize objects, make inferences, and/or perform related artificial intelligence operations). In some embodiments, memory controller 106 may include a vector function unit (VFU) 130, which may be embodied as any device or circuitry (e.g., dedicated circuitry, reconfigurable circuitry, an application specific integrated circuit (ASIC), a field programmable gate array (FPGA), etc.) capable of offloading vector-based tasks from processor 102 (e.g., comparing data read from specific columns of vectors stored in the memory media 110, determining Hamming distances between the vectors stored in the memory media 110 and a search key, sorting the vectors according to their Hamming distances, etc.).

Figure 2:
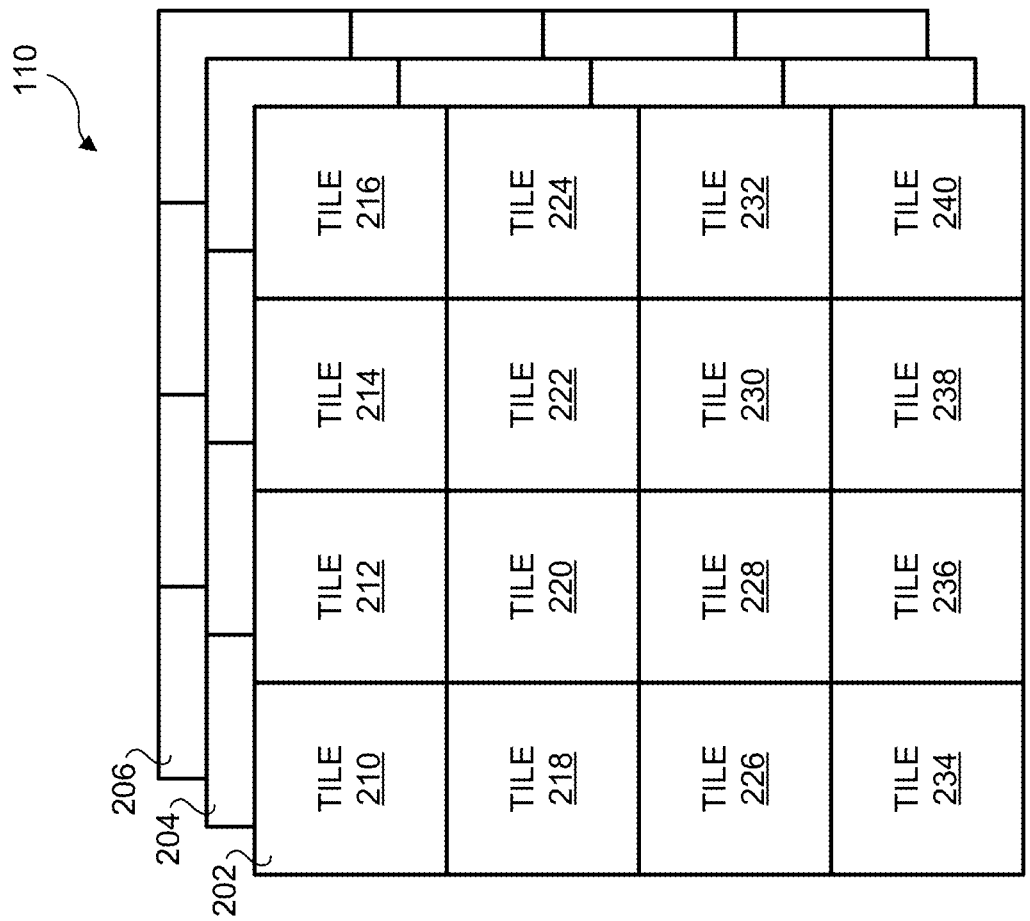
FIG. 2 is a simplified diagram of at least one embodiment of a memory media included in the compute device of FIG. 1.

As shown in FIG. 2, memory media 110 includes a tile architecture, also referred to herein as a cross-point architecture. Under the cross-point architecture, memory cells sit at the intersection of word lines and bit lines and are individually addressable, in which each memory cell (e.g., tile) 210, 212, 214, 216, 218, 220, 222, 224, 226, 228, 230, 232, 234, 236, 238, 240 is addressable by an x parameter and a y parameter (e.g., a column and a row). Memory media 110 includes multiple partitions, each of which includes the tile architecture. The partitions may be stacked as layers 202, 204, 206 to form a three-dimensional (3D) cross-point architecture, such as employed by but not limited to Intel® 3D XPoint™ memory. Unlike conventional memory devices, in which only fixed-size multiple-bit data structures (e.g., byte, words, etc.) are addressable, media access circuitry 108 is configured to read individual bits, or other units of data, from memory media 110 at the request of the memory controller 106, which may produce the request in response to receiving a corresponding request from the processor 102.

Returning to FIG. 1, memory 104 may include non-volatile memory and volatile memory. The non-volatile memory may be embodied as any type of data storage capable of storing data in a persistent manner, including when power is removed from the non-volatile memory). For example, the non-volatile memory may be embodied as one or more non-volatile memory devices. The non-volatile memory devices may include one or more memory devices configured in a cross-point architecture that enables bit-level addressability and are embodied as 3D cross-point memory. In some embodiments, the non-volatile memory may additionally include other types of memory, including any combination of memory devices that use chalcogenide phase change material (e.g., chalcogenide glass), ferroelectric transistor random-access memory (FeTRAM), nanowire-based non-volatile memory, phase change memory (PCM), memory that incorporates memristor technology, Magnetoresistive random-access memory (MRAM) or Spin Transfer Torque (STT)-MRAM.

Volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein can be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, DDR5 (DDR version 5, currently in discussion by JEDEC), LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org. The volatile memory may have an architecture that enables bit-level addressability, similar to the architecture described above.

Processor 102 and memory 104 are communicatively coupled to other components of the compute device 100 via I/O subsystem 112, which may be embodied as circuitry and/or components to facilitate I/O operations with processor 102, main memory 104 and other components of the compute device 100. For example, I/O subsystem 112 may be embodied as, or otherwise include, memory controller hubs, I/O control hubs, integrated sensor hubs, firmware devices, communication links (e.g., point-to-point links, bus links, wires, cables, light guides, printed circuit board traces, etc.), and/or other components and subsystems to facilitate the I/O operations. In some embodiments, I/O subsystem 112 may form a portion of a system-on-a-chip (SoC) and be incorporated, along with one or more of the processor 102, memory 104, and other components of the compute device 100, in a single chip.

Data storage device 114 may be embodied as any type of device configured for short-term or long-term storage of data such as, for example, memory devices and circuits, memory cards, hard disk drives, solid-state drives, or other data storage device. In the illustrative embodiment, data storage device 114 includes a memory controller 116, similar to the memory controller 106, memory media 120 (also referred to as "storage media"), similar to the memory media 110, and media access circuitry 118, similar to the media access circuitry 108. Further, memory controller 116 may also include a vector function unit (VFU) 132 similar to the vector function unit (VFU) 130. Data storage device 114 may include a system partition that stores data and firmware code for the data storage device 114 and one or more operating system partitions that store data files and executables for operating systems.

Communication circuitry 122 may be embodied as any communication circuit, device, or collection thereof, capable of enabling communications over a network between the compute device 100 and another device. Communication circuitry 122 may be configured to use any of one or more communication technology (e.g., wired or wireless communications) and associated protocols (e.g., Ethernet, USB, Bluetooth®, Wi-Fi®, WiMAX, etc.) to effect such communication.

The illustrative communication circuitry 122 includes a network interface controller (NIC) 124, which may also be referred to as a host fabric interface (HFI). NIC 124 may be embodied as one or more add-in-boards, daughter cards, network interface cards, controller chips, chipsets, or other devices that may be used by the compute device 100 to connect with another compute device via a network or fabric. In some embodiments, NIC 124 may be embodied as part of a system-on-a-chip (SoC) that includes one or more processors, or included on a multichip package that also contains one or more processors. In some embodiments, NIC 124 may include a local processor (not shown) and/or a local memory (not shown). In such embodiments, the local processor of NIC 124 may be capable of performing one or more of the functions of the processor 102. Additionally or alternatively, in such embodiments, the local memory of NIC 124 may be integrated into one or more components of the compute device 100 at the board level, socket level, chip level, and/or other levels.

The one or more accelerator devices 126 may be embodied as any device(s) or circuitry capable of performing operations in an accelerated manner that are offloaded from processor 102. For example, accelerator device(s) 126 may include a graphics processing unit (GPU) 128, which may be embodied as any device or circuitry (e.g., a co-processor, an ASIC, reconfigurable circuitry, etc.) capable of performing graphics operations (e.g., matrix operations). In some embodiments, a GPU may employ a programming language targeted to machine learning and AI operations, such as CUDA or a similar language that leverages the underlying processor elements and structures in the GPU.

Figure 3:
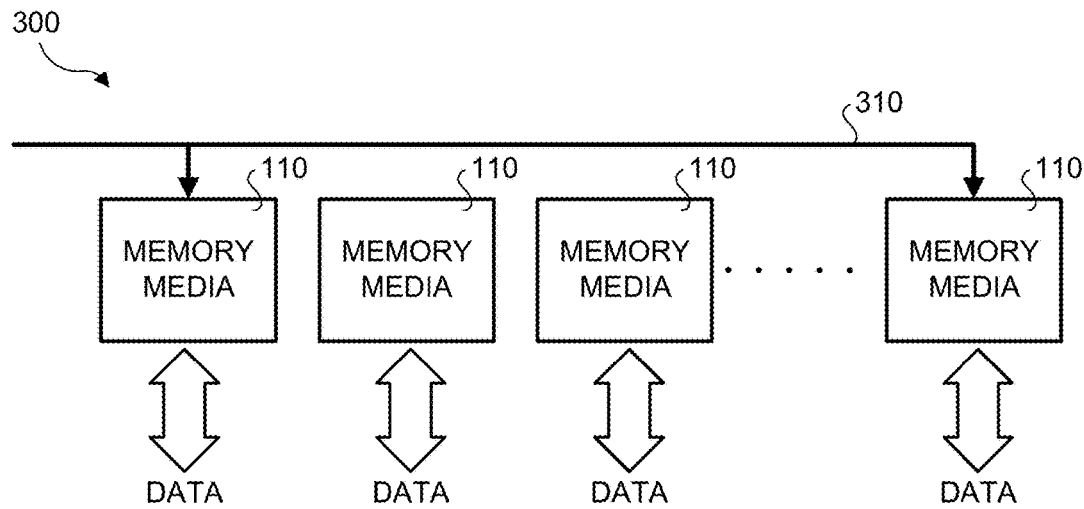
FIG. 3 is a simplified diagram of at least on embodiment of the memory media of the compute device of FIG. 1 in a dual in-line memory module (DIMM)

Referring now to FIG. 3, compute device 100, in some embodiments, may utilize a dual in-line memory module (DIMM) architecture 300. In DIMM architecture 300, multiple dies of the memory media 110 are connected to a shared command address bus 310. As such, in operation, data is read out in parallel across all memory media 110 connected to shared command address bus 310. Data may be laid out across memory media 110 in a configuration to allow reading the same column across multiple connected dies of memory media 110.

Figure 4:
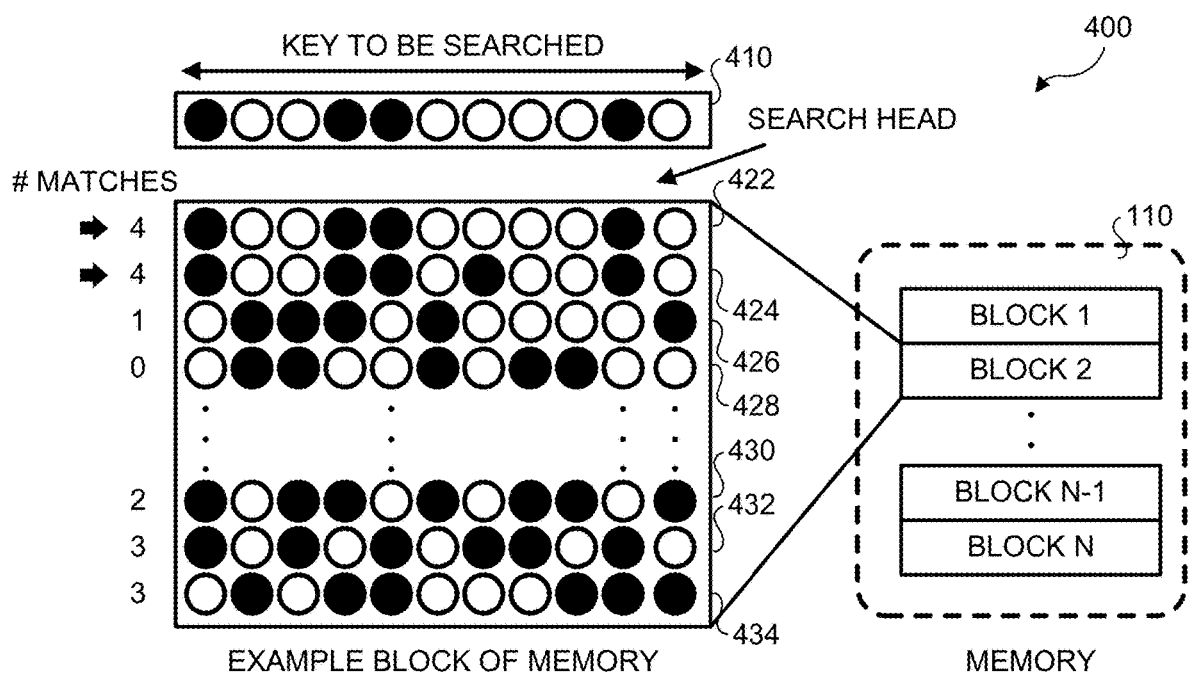
FIG. 4 is a simplified diagram of a stochastic associative search (SAS) performed using a binary search key on the memory media of FIGS. 1-3.

As illustrated in FIG. 4, compute device 100 may perform a stochastic associative search 400, which is a highly efficient and fast way of searching through a large database of records and finding similar records to a given query record (key). For simplicity and clarity, the stochastic associative search 400 and other processes are described herein as being performed with memory 104. However, it should be understood that the processes could alternatively or additionally be performed with storage device 114, depending on the particular embodiment. Given that memory media 110 allows both row- and column-wise reads with similar read latency, memory media 110 is particularly suited to enabling efficient stochastic associative searches. As described in further detail below, to utilize the characteristics of the memory media 110 to perform efficient stochastic associative searches, compute device 100 writes database elements (e.g., records, vectors, rows, etc.) to memory media 110 in binary format (e.g., ones and zeros) as sparse (e.g., have more zeros than ones) bit vectors. (Bit vectors are also called bit arrays in the computer arts.) In some embodiments, the sparse bit vectors comprise hash codes (e.g., sequences of values produced by a hashing function), although any form of sparse bit vector may be used. Subsequently, in performing a search, individual binary values (bits) of search key 410 are compared to the corresponding binary values in the database elements (e.g., bit vectors) 422, 424, 426, 428, 430, 432, 434 stored in the blocks of memory media 110. Compute device 100 determines the number of matching set bits between the search key 410 and each database element (e.g., vector), which is representative of a Hamming distance between the search key 410 and each database element (e.g., vector). The database elements (e.g., vectors) having the greatest number of matches (e.g., lowest Hamming distance) are the most similar results (e.g., the result set) for the stochastic associative search 400. Compute device 100 may also produce a refined result set by mapping a portion of the result set (e.g., the 100 top results) and the search key to another space (e.g., floating point space), and finding a smaller set (e.g., the top ten) of the results that have the closest Euclidean distance from the search key.

Example flows of operations may proceed as follows depending on the particular embodiment (e.g., whether the vector function unit 130 is present). The elements are stored in the memory media 110 as bit vectors using row write operations. For a given stochastic associative search, the compute device 100 formats a search query using a hash encoding that matches the hash encoding used to produce the binary format of the bit vectors in the database. In at least some embodiments in which VFU 130 is not present, processor 102 sends a block column read request to the memory controller 106 to read specified columns (e.g., the columns corresponding to the set bits (bits having a value of '1') in search key 410). Processor 102 subsequently ranks all or a top portion M of matching rows (bit vectors) based on the number of set bits matching for the column data that was read. Prior to providing the results to the application, processor 102 may perform refinement of the search results.

In at least some embodiments in which VFU 130 is present, the process proceeds as follows. Processor 102 sends an instruction to memory controller 106 to perform a macro operation (e.g., return top M results based on a given search key 410). Subsequently, memory controller 106 sends a block column read request to the media access circuitry 108 to read, from the memory media 110, the columns corresponding to the set bits in the search key 410. VFU 130 in memory controller 106 subsequently ranks and sorts the top M matching rows (e.g., vectors) based on the number of set bits matching the column data that was read, and memory controller 106 subsequently sends, data indicative of the top M matching rows (e.g., vectors) as the search results to processor 102. Processor 102 may subsequently perform refinement of the search results. In some embodiments, the VFU 130 may perform at least a portion of the refinement of the search results.

Optimization of Bit Vector matching using SAS.

In accordance with aspects of the embodiments discussed below, techniques for optimizing bit vector matching using SAS are disclosed. The techniques take advantage of the column-wise access supported by SAM in combination with statistical characteristics common to many datasets. The techniques may be applied to various types of data that are encoded using sparse bit vectors. To better understand the approach, a non-limiting example applied to images is now provided.

Figure 5:
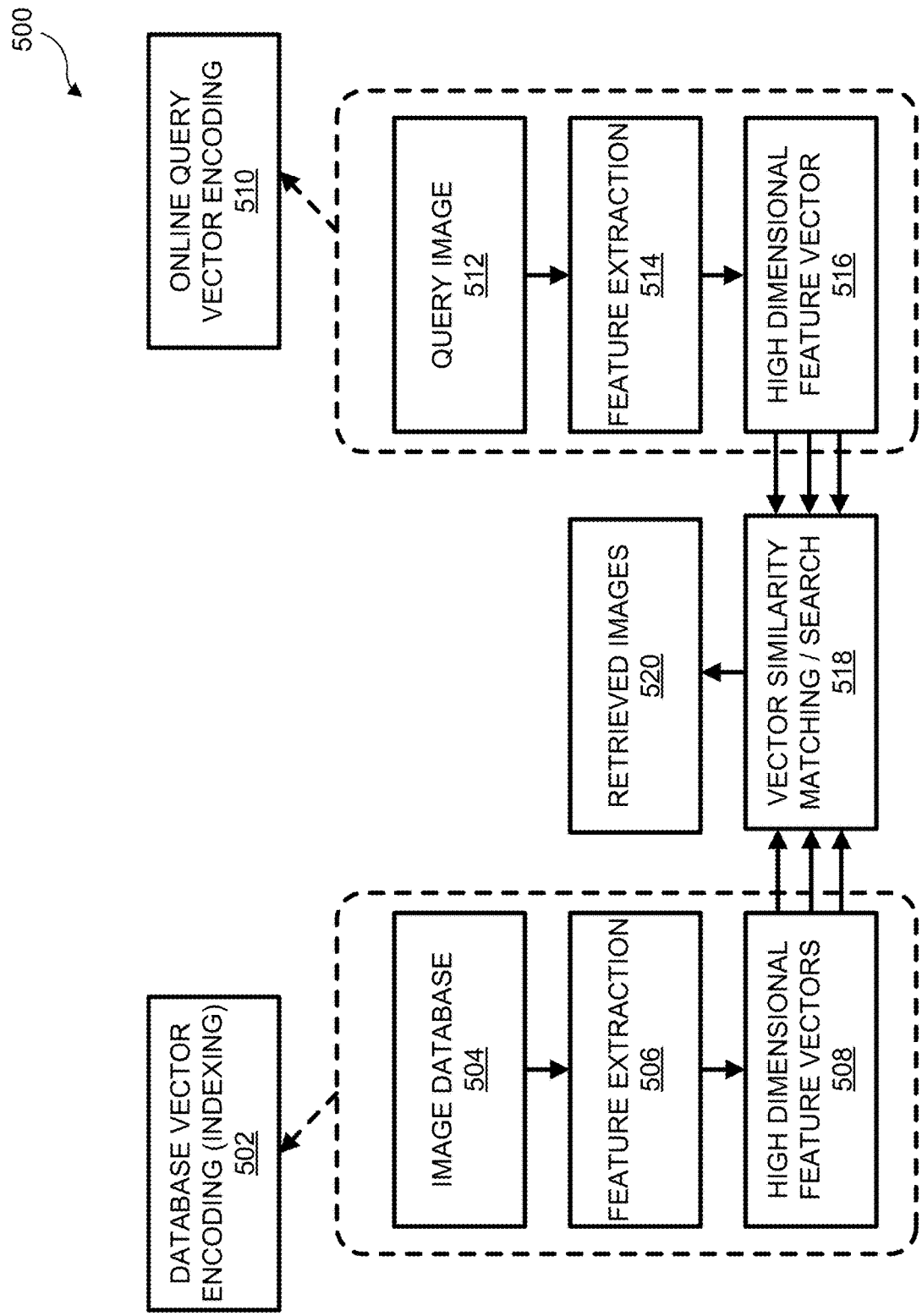
FIG. 5 is a simplified diagram of at least one embodiment of a content-based image retrieval (CBIR) system that may be implemented using the compute device of FIG. 1.

FIG. 5 shows a content-based image retrieval (CBIR) system 500, according to one embodiment. Given a database of high-dimensional vectors and a query vector q (e.g., the search key 410 of FIG. 4) of the same dimensions, CBIR system 500 searches for database vectors (e.g., vectors 422, 424, 426, 428, 430, 432, 434 of FIG. 4) that are similar or closer to q than others, based on a similarity function (e.g., a function that determines a distance between the query vector and database vectors). For example, CBIR system 500 identifies similar images in a database using a query image. In one embodiment, one or more machine learning (ML) models, such as a deep-learning model are used for feature extraction.

The left-hand side of FIG. 5 is related to database vector encoding 502 for a corpus of images. This includes an image database 504 in which images are stored. A feature extraction operation 506 is performed on images in image database 504 to generate high dimension feature vectors 508 comprising sparse bit vectors. The right-hand side of FIG. 5 is related to an online query vector encoding process 510. It includes a query image 512 for which feature extraction 514 is performed to generate a high dimension feature vector 516. A vector similarity matching/search process 518 is performed to identify images (retrieved images 520) that match and/or are most similar to query image 512.

Figure 6:
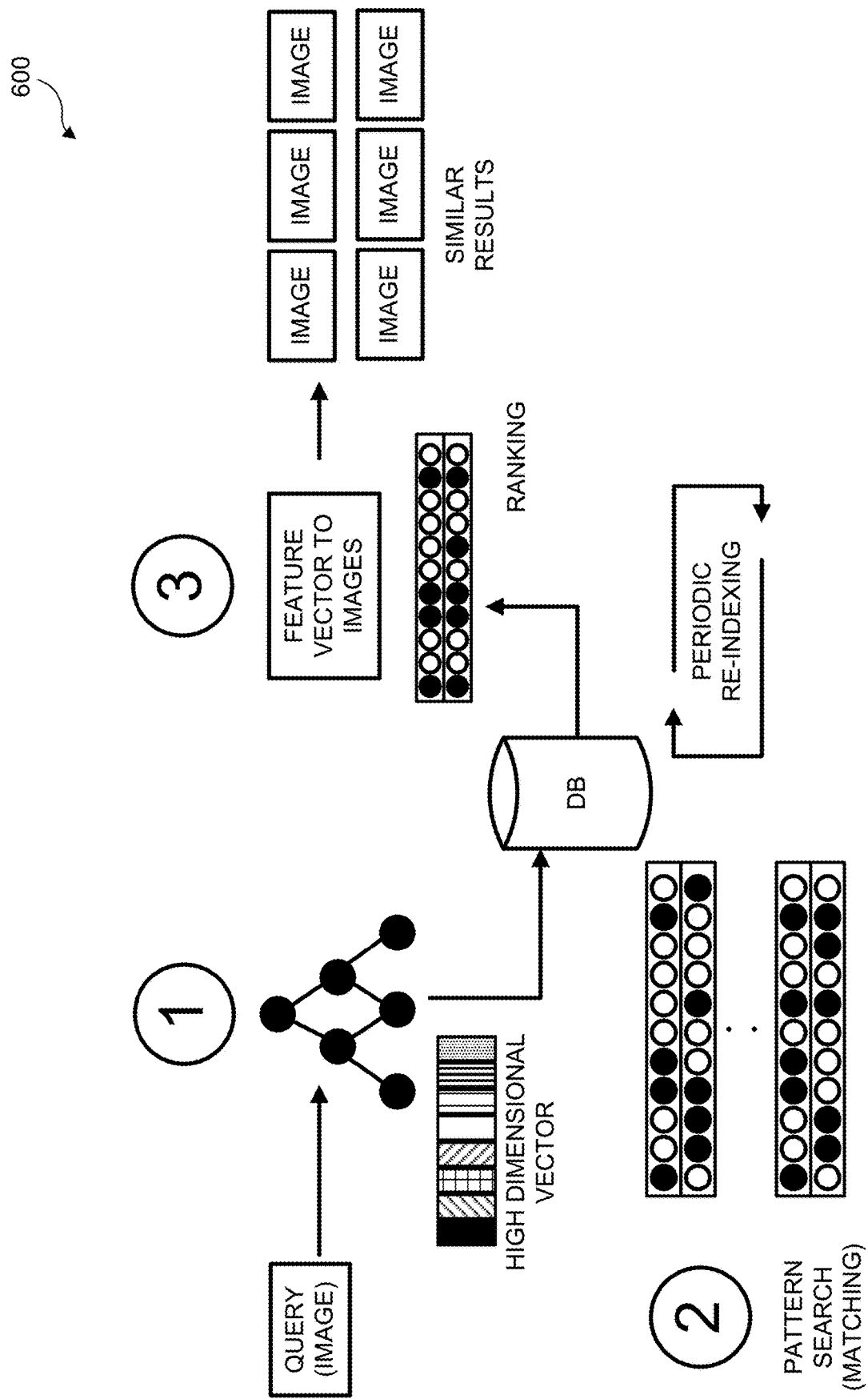
FIG. 6 is a simplified diagram of a deep learning-based similarity search workflow for the CBIR system of FIG. 5.

FIG. 6 illustrates an example of a deep learning-based similarity search workflow 600 for CBIR system 500, where the vectors represent the extracted features from the content of images. In other embodiments, the vectors may represent the content of other objects (e.g., sounds, video, bioinformatics data, etc.) extracted and summarized (e.g., via deep learning or another process). In the illustrative embodiment, compute device 100, in operation, implements a content-based similarity search system (e.g., CBIR system 500) that improves the runtime performance (e.g., speed, power usage, etc.) and accuracy of a search. Moreover, compute device 100 operates on modern, large-scale (e.g., order of billions), complex, and high-dimensional datasets, utilizing the unique features of memory media 110 (e.g., column and row addressability).

Figure 7:
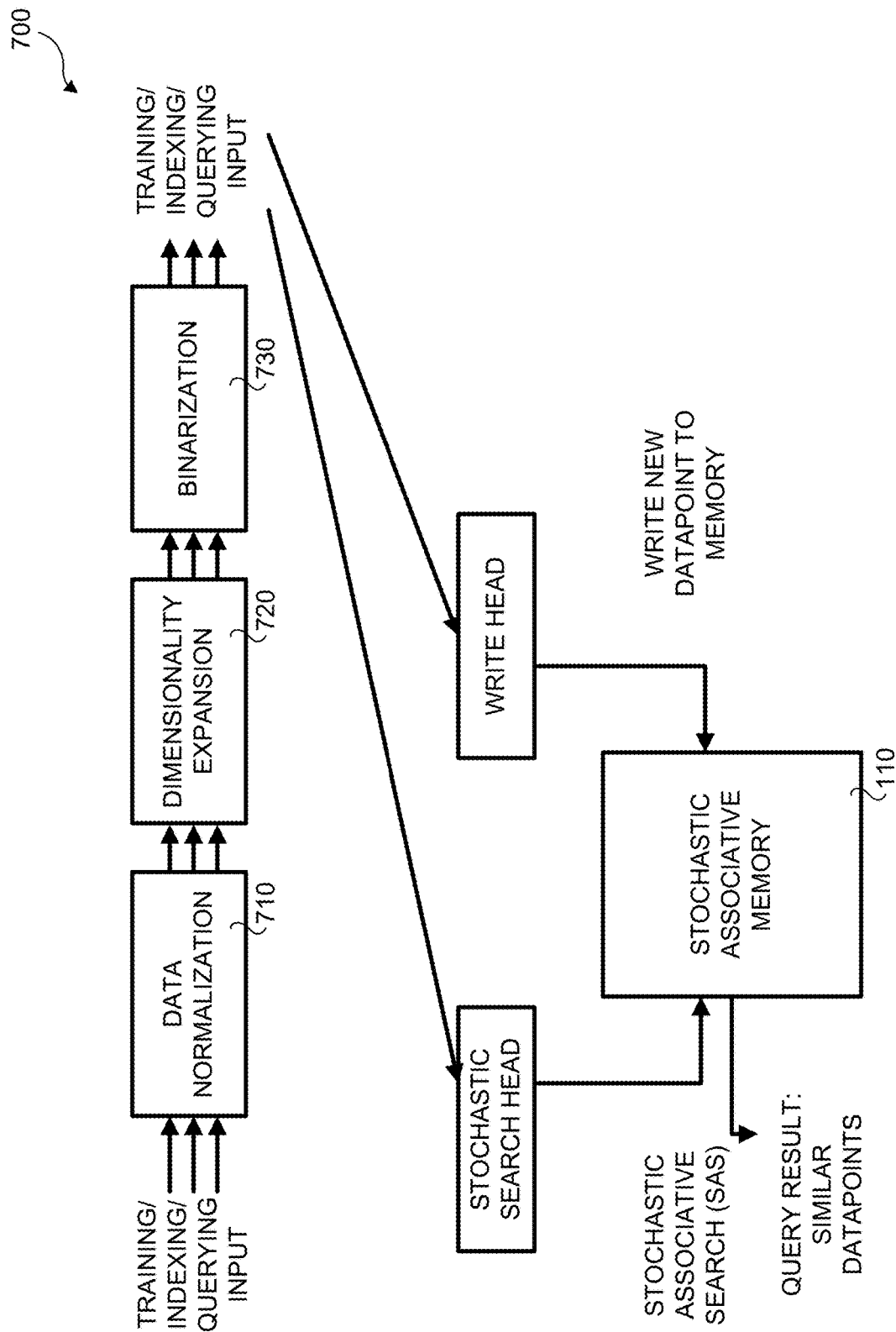
FIG. 7 is a diagram of a random sparse lifting (RSL) data and control flow similarity search pipeline that may be implemented using the memory media of the compute device of FIG. 1.
Figure 8:
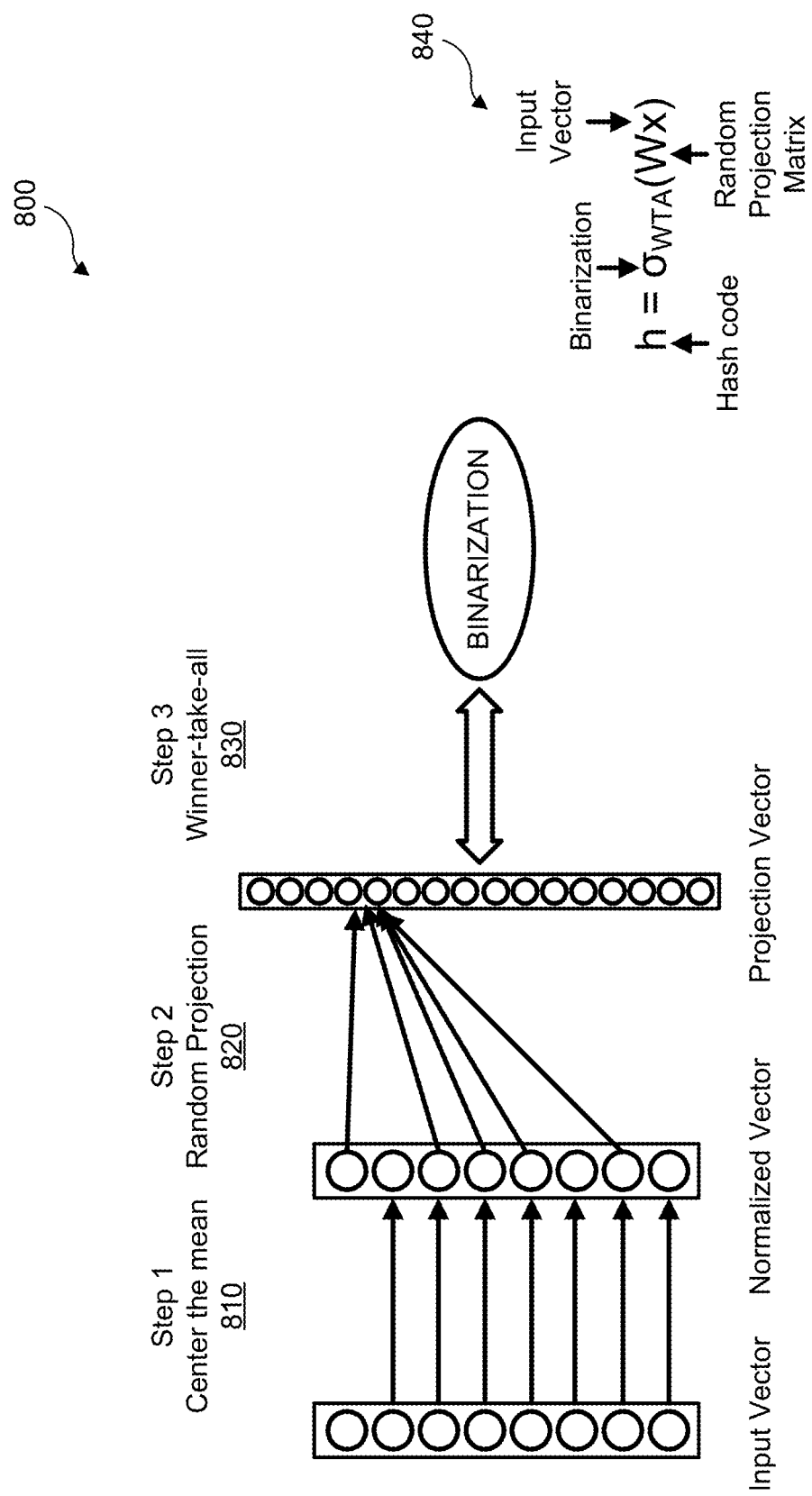
FIG. 8 is a diagram of an algorithmic pipeline for random sparse lifting (RSL) and a mathematical equation for performing RSL that may be implemented using the compute device of FIG. 1.

Referring now to FIG. 7, compute device 100 implements a random sparse lifting (RSL) data and control flow similarity search pipeline 700 using memory media 110. Also referring to FIG. 8, an algorithmic pipeline 800 which may be utilized by compute device 100 for performing RSL and a mathematical equation 840 for performing RSL are shown. In random sparse lifting, compute device 100 takes as an input vector x (e.g., a d-dimensional floating-point vector) and operates in the following three steps, as illustrated in FIGS. 7 and 8. In a step 710, 810, compute device 100 performs data normalization by normalizing input data to add invariance to specific deformations (e.g., translations, rotations, sheer stress, etc.). For example, compute device 100 may determine the mean of the values in input data (e.g., in an input data vector) and remove (e.g., subtract) the mean from the values. In a subsequent step 720, 820, compute device 100 performs dimensionality expansion by randomly projecting the normalized input data to a higher dimensional space D where D is greater than d (e.g., 20- to 40-fold increase in dimensionality). The random projection ensures that each element in the higher-dimensional projection vector receives and sums relatively few elements from the input vector, as shown in FIG. 8. The procedure can be formalized as matrix multiplication of input vector x and a binary sparse projection matrix W of dimension (D×d). Compute device 100 stores the random sparse projection matrix W (also referred to as the model parameter) in memory (e.g., memory 104) to be used for subsequent queries. In a subsequent step 730, 830, compute device 100 binarizes the projection vector to produce a hash code using a winner-take-all (WTA) strategy in which only a small fraction of top entries (e.g., largest values) in the projection vector (e.g., 5% to 10% of D) are set to one and the rest are set to zero.

The RSL procedure efficiently leverages the unique features of the memory media (e.g., the ability to read individual columns) to accelerate a similarity search on a large scale database (e.g., order of a billion elements) without losing the accuracy of the results. Specifically, the algorithm generates sparse binary hash codes and is a distance preserving transformation from input to Hamming space. Hamming distances between hash codes approximate the Euclidean distance between the data points that produced them. Further, the sparse binary hash code reduces the number of memory read operations that would otherwise be required because of the relatively few ones compared to zeros in the hash code, and information is contain only in the set bits (e.g., the bits set to one) in the binary hash code. As such, the binary hash code satisfies all the requirements of the stochastic associative search and can benefit from the in-memory binary search acceleration provided by the memory 104.

Figure 9:
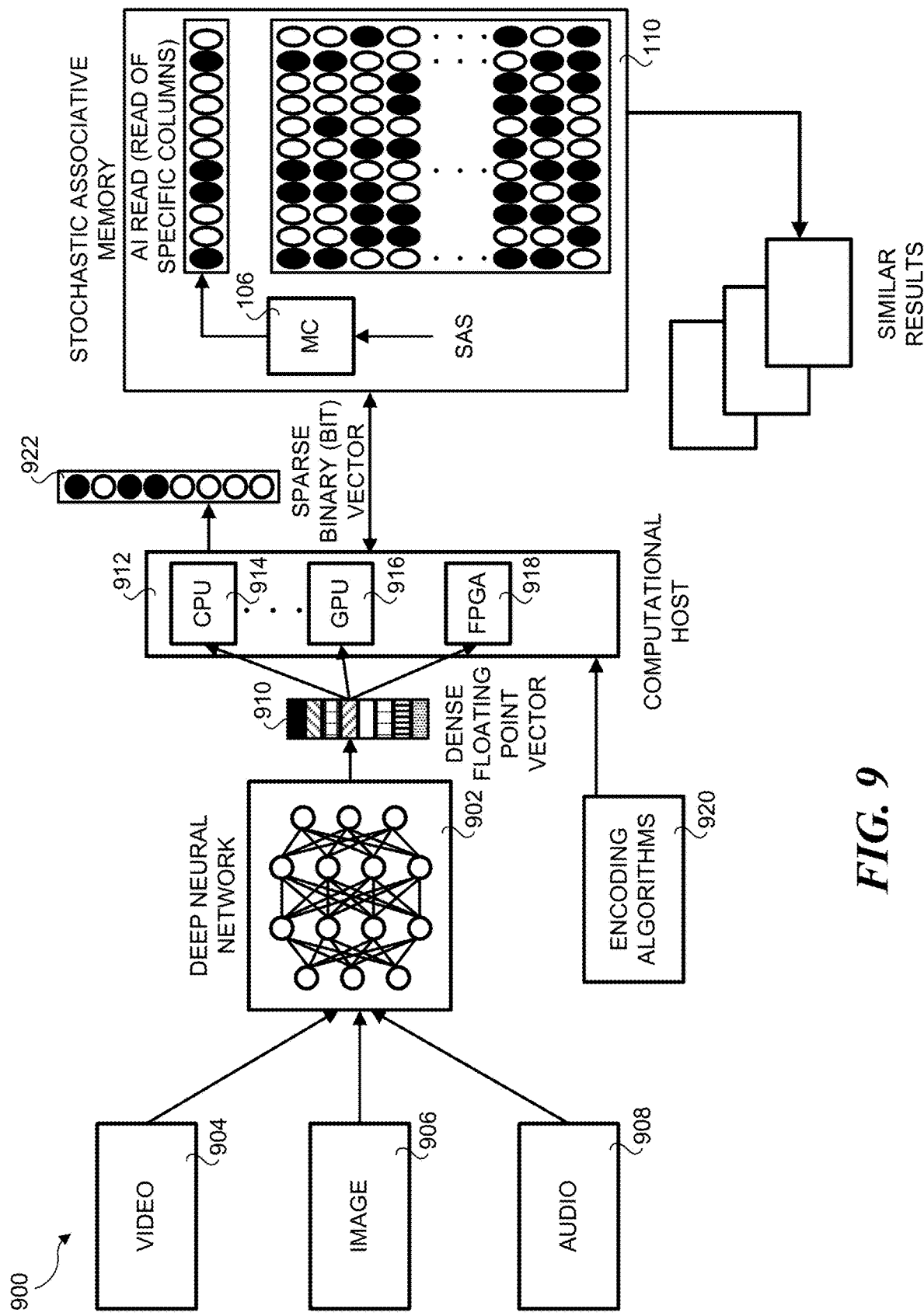
FIG. 9 is a diagram of a hardware mapping of stages of the RSL pipeline of FIG. 8.

FIG. 9 shows an embodiment of a hardware mapping 900 of the stages of an RSL pipeline (similar to the pipeline 700). During training using a deep neural network 902, a random sparse projection matrix W is generated under which the input data set (e.g., comprising video 904, images 906 or audio 908) is transformed from dense floating point vectors 910 to high-dimensional sparse binary hash codes comprising sparse bit vectors 922. The transformation is performed by a computational host 912 (e.g., a central processing unit (CPU) 914, a graphics processing unit (GPU) 916, a field programmable gate array (FPGA) 918, or other circuitry) using one or more encoding algorithms 920. Subsequently, the hash codes and the projection matrix W are stored in a stochastic associative memory (e.g., memory media 110). The same sparse projection matrix W is also used during indexing to generate binary hash codes for new elements added to the database. Query processing involves retrieving the stored matrix W and performing the above three steps to generate the sparse binary code to be used for searching (e.g., the search key 410 of FIG. 4). The compute device 100 compares the query hash code (e.g., the search key 410) with the database hash codes (e.g., the vectors 422, 424, 426, 428, 430, 432, 434) and calculates the pair-wise Hamming distances (e.g., based on the matching bits, as described above). The comparison, in the illustrative embodiment, is performed in the memory (e.g., in memory 104). Further, in the illustrative embodiment, memory 104 (e.g., the memory controller 106) at least partially sorts the database elements (e.g., the vectors 422, 424, 426, 428, 430, 432, 434) based on the Hamming distances and returns the indices of the closest matching vectors 422, 424, 426, 428, 430, 432, 434 (e.g., the closest matching M vectors).

Figure 10A:
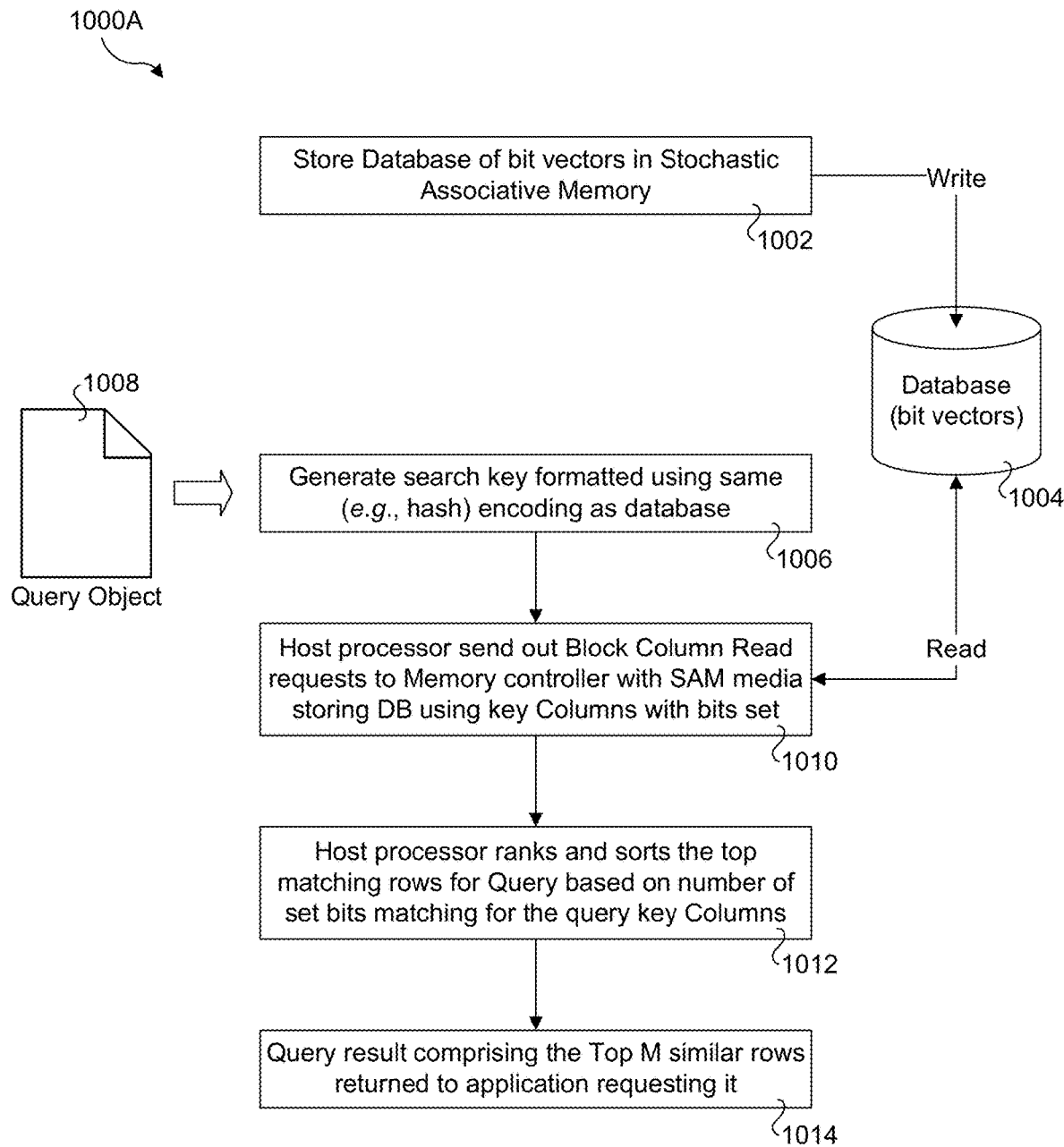
FIG. 10A is a flowchart illustrating an overview of operations performed during similarity searches by computing system employing a memory controller that do not include a VPU, according to one embodiment.

FIG. 10A shows a flowchart 1000A illustrating an overview of operations performed by embodiments of memory controllers that do not include a VPU. In a block 1002, a database of bit vectors 1004 is created in Stochastic Associative Memory (e.g., memory media 110 or 120) by generating bit vectors in one of more of the manners described above, and writing the bit vectors as row entries. Generally, the operation in block 1002 may be performed in advance or on an ongoing basis (where additional bit vectors are added to database 1004.

The operations in blocks 1006, 1010, 1012, and 1014 are performed for each search query of database 1004. This begins in block 1006, in which a search key is generated for an input query object 1008 submitted by an application using the same encoding as used in database 1004. For example, if query object 1008 is an image, the hash-based encoding scheme described above may be used for generating the search key.

In block 1010 the host processor sends out block column read requests to the memory controller for the SAM media used for storing database 1004 using search key columns having their bits set (i.e., columns with '1's). In block 1012 the host processor ranks and sorts the top matching rows for the query based on the number of set bits matching for the search key columns. The query results comprising the top N similar rows are then returned to the requesting application in block 1014.

Figure 10B:
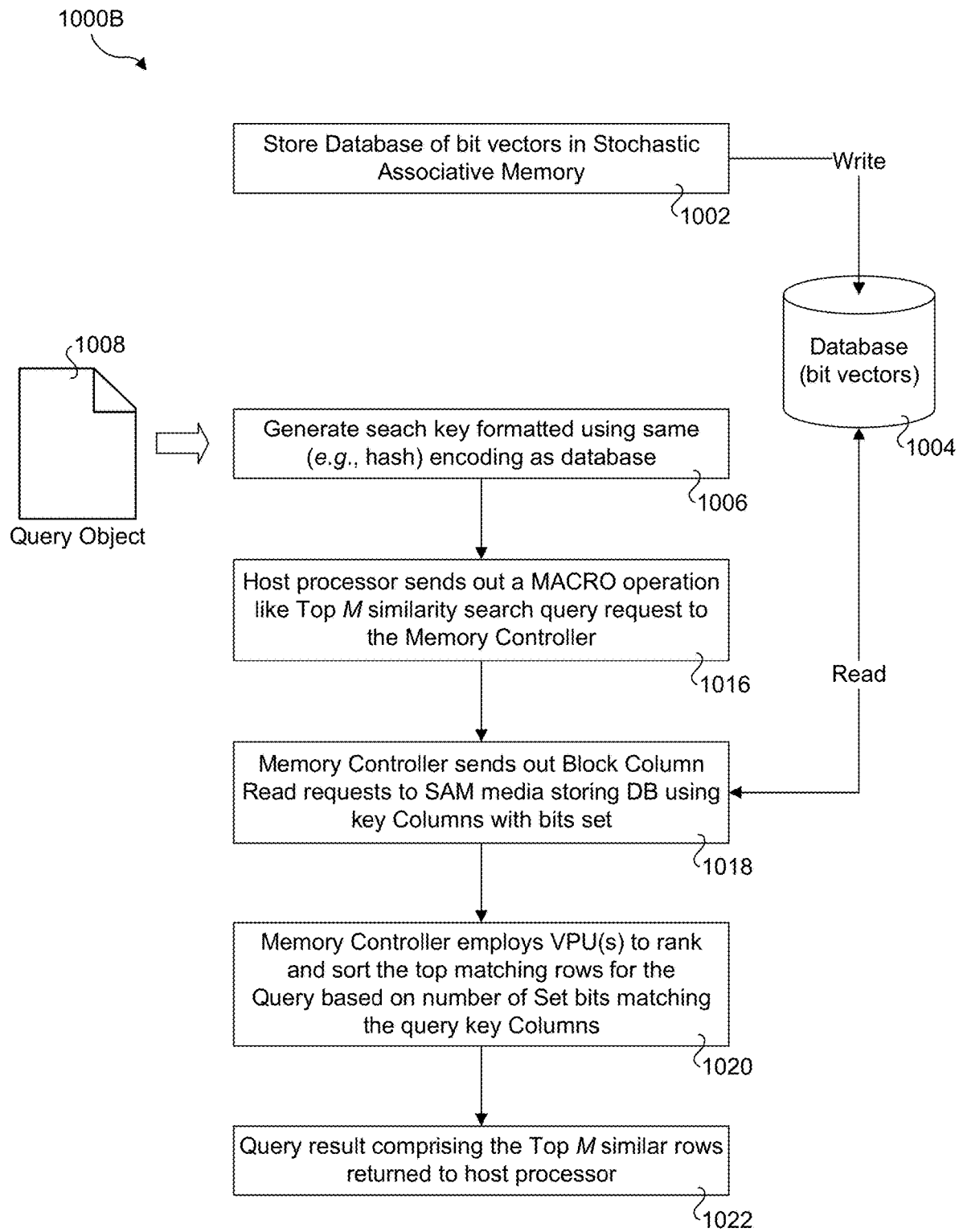
FIG. 10B is a flowchart illustrating an overview of operations performed during similarity searches by computing system employing a memory controller with a VPU, according to one embodiment.

FIG. 10B shows a flowchart 1000B illustrating operations performed by a memory controller including one of more VPUs. As indicated by like reference numbers, the operations in block 1002 and 1006, query object 1008, and database 1004 are the same for both flowchart 1000A and 1000B. In a block 1016, the host processor sends out a MACRO operation like a top M similar search query request to the memory controller. In a block 1018 the memory controller sends out block column read requests to the SAM media used for storing database 1004 using the search key columns having their bits set. The memory controller employs its one or more VPUs to rank and sort the top matching rows for the query based on the number of set bits matching the search key columns, as shown in a block 1020. The query result comprising the top M similar rows are then returned to the host processor in a block 1022.

Figure 11A:
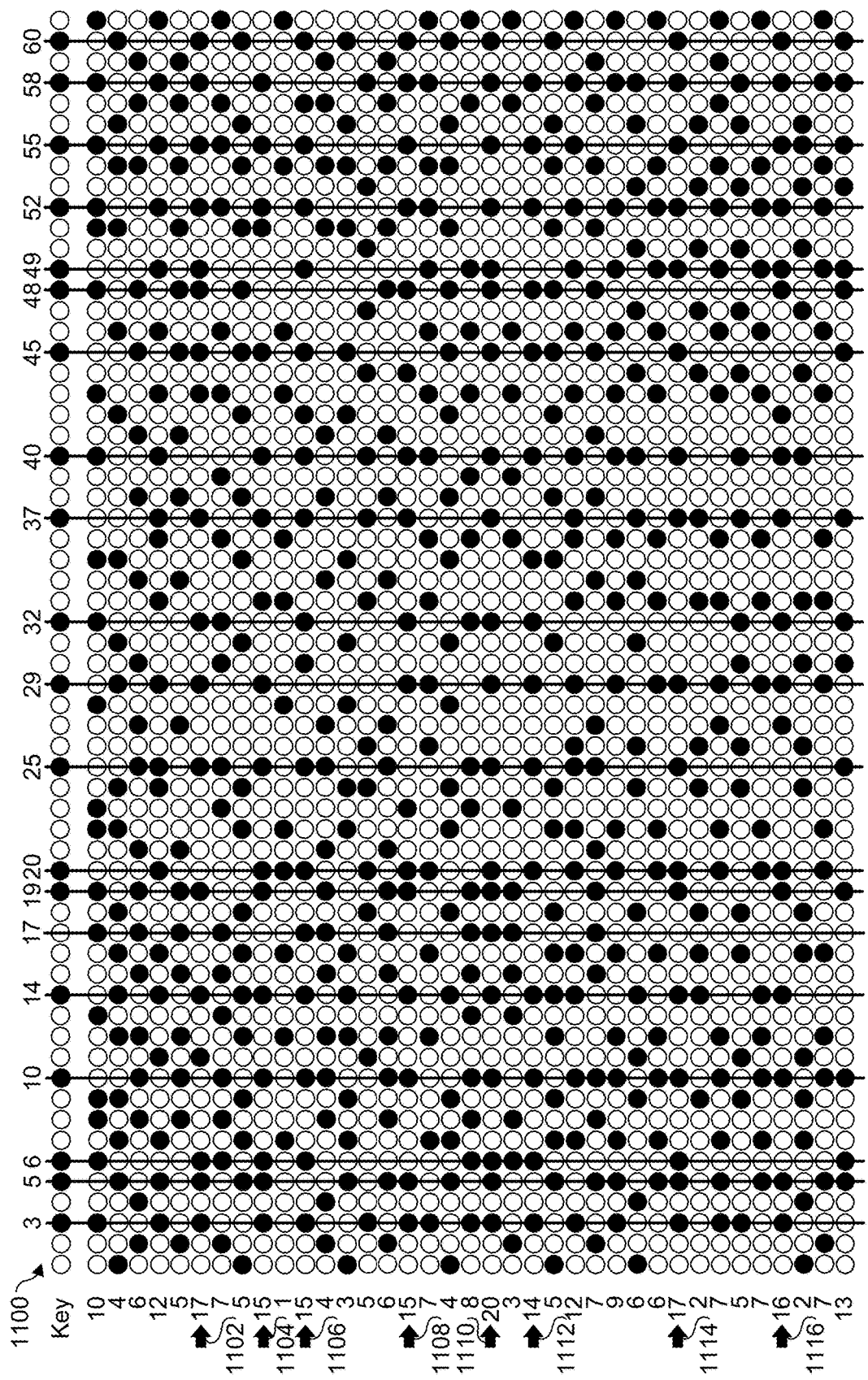
FIG. 11A shows a matrix of binary data stored in rows in columns in memory media and further illustrates an example query result as applied to a simplified portion of a database under which all set columns in a search key are read.

FIG. 11A shows an example query result as applied to a simplified portion of database 1004. For illustrative purposes, only the first 61 columns of the first 37 rows in database 1004 are shown; one of skill in the art will recognize a database may have 100's of columns (e.g., 1000) and millions to billions of rows. Additionally, for illustrative purposes the sparsity of the bit vectors shown in FIG. 11A is greater than what might be present in practice (e.g., the 5-10% sparsity discussed above for image encoding).

In this example, a search (or query) key 1100 has bits set for columns 3, 5, 6, 10, 14, 17, 19, 20, 25, 29, 32, 37, 40, 45, 48, 49, 52, 55, 58 and 60. The parallel column read operations are applied to these columns, returning a vertical bit vector for each column. The set bits in the vertical bit vectors are the summed on a row-wise basis for each row. The values to the left of the matrix and below the word "Key" are the set bit match totals for each row (e.g., 10, 4, 6, 12 . . . )—these set bit match totals comprise similarity scores. The row with largest number of matched set bits (an thus the highest similarity score) is the nearest neighbor of the query. An objective of the process is to return the top M nearest neighbors, in one embodiment.

For this example, M=8, where the top 8 rows include row 1102 (17 matches), row 1104 (15 matches), row 1106 (15 matches), row 1108 (15 matches), row 1110 (20 matches), row 1112 (14 matches), row 1114 (17 matches) and row 1116 (16 matches). It is noted that under this embodiment set bits in columns in the search key that are not read are not considered. Under some embodiments, the bit vectors for the row entries in the database are encoded to have the same number of set bits for each entry.

Accuracy and Performance Tuning

As aspect of similarity searching using SAS involves encoding the data to be searched (e.g., dataset of database of objects such as images) as sparse bit vectors and writing those encoded bit vectors to the SAM media. The accuracy of search on these sparse bit vectors depends on the degree of sparsity (number of set bits chosen). More set bits (less sparse) mean more accurate but slower searches, as only the set bits are read for the search queries. Moreover, this accuracy/throughput combination is fixed by the choice of sparsity during encoding and writing to media. This is the constraint of the approach shown in FIGS. 4 and 9 described above. However, the accuracy and throughput may need to be changed during search depending on traffic/load on the system.

Column Subsampling

In accordance with a first approach for tuning the accuracy vs performance for similarity searches, subsampling of column set bits is performed. For some applications it may be desirable to increase throughput while accepting less accuracy based on a throughput/accuracy trade-off. Under this first approach, a fraction (e.g., subset s) of the set bit columns (columns in the search key with bits set) are read for the search queries. For example, if the data and queries are encoded with 50 set bits out of a bit vector of length 1000 (5% sparsity), a fraction of the columns (e.g., 50% or 25 columns) out of the 50 columns with set bits in the search key may be used to select the nearest neighbors using the same approach illustrated in FIG. 11A. This will provide a 2× boost in throughput, at the cost of some accuracy loss. Generally, as the subsample fraction is reduced, throughput will increase while the accuracy will diminish.

Different column subsampling techniques may be used, search as random subsampling, subsampling using a predetermined pattern, and subsampling (a) selected portion(s) of the bit vectors. For example, under image encoding using the hash-based scheme shown in FIG. 8, using random subsampling or predetermined patterns may yield similar results. Under other type of sparse bit vector encoding, certain portions of the columns may contain (on average) more relevant bit values than other portion of the columns. Thus, subsampling the more relevant columns will reduce the cost of inaccuracy (for a given subsample fraction).

Figure 11B:
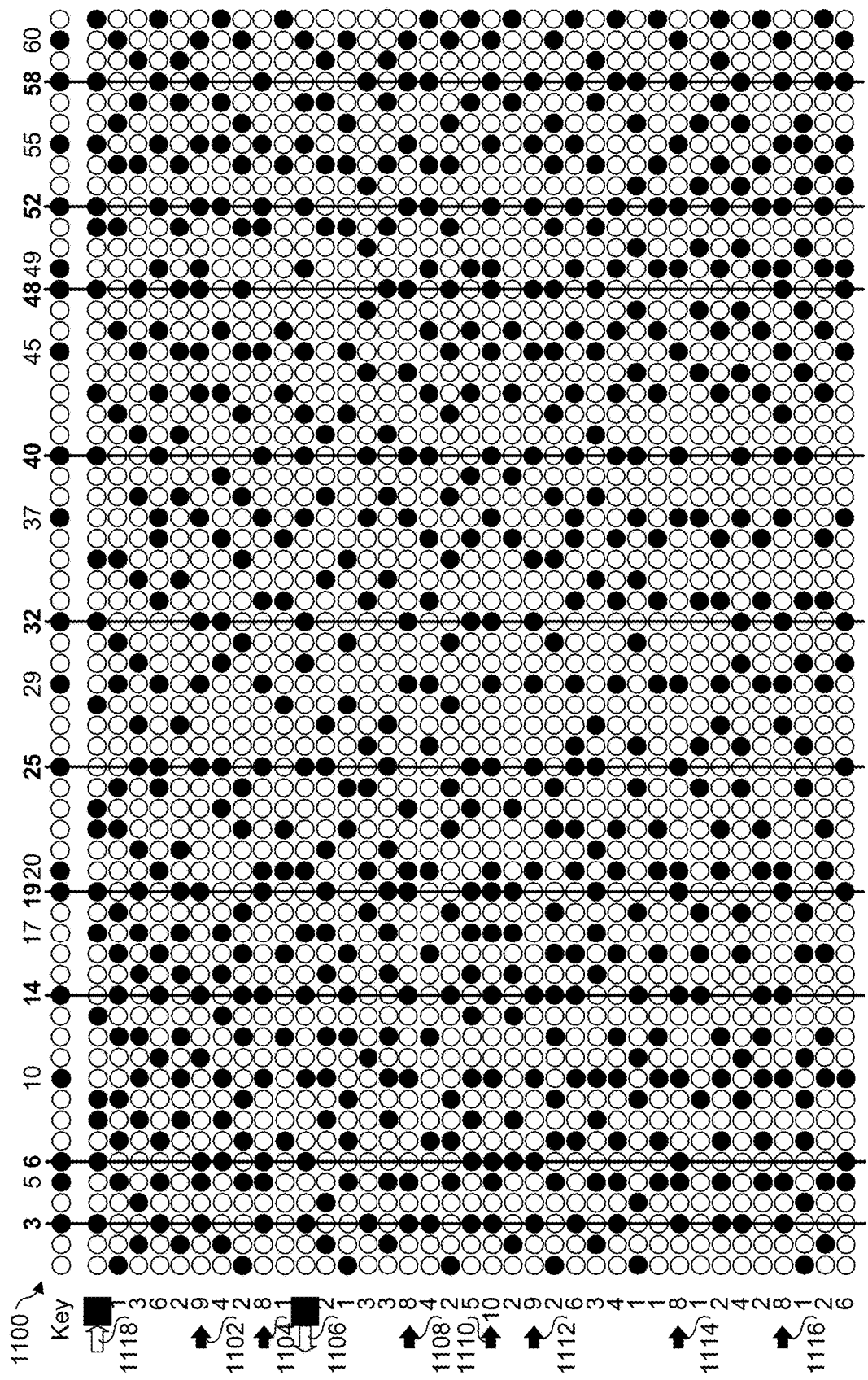
FIG. 11B shows the matrix of binary of FIG. 11A media and further illustrates an example query result as applied to the simplified portion of a database under which a subsample of columns with set bits in the search key are read.

FIG. 11B shows an example of subsampling every other column with a bit set in search key 1100. As shown, the columns (with numbers shown in bold) now include columns 3, 6, 14, 19, 25, 32, 40, 48, 52, and 58. As before, the top 8 rows with the highest matching columns are returned as the search/query result. As before, these top 8 rows include row 1102 (9 matches), row 1104 (8 matches), row 1108 (8 matches), row 1110 (10 matches), row 1112 (9 matches), row 1114 (8 matches) and row 1116 (8 matches). In this example, row 1106 (7 matches) has fallen out of the top 8 and has been replaced by row 1118 (8 matches).

Figure 12:
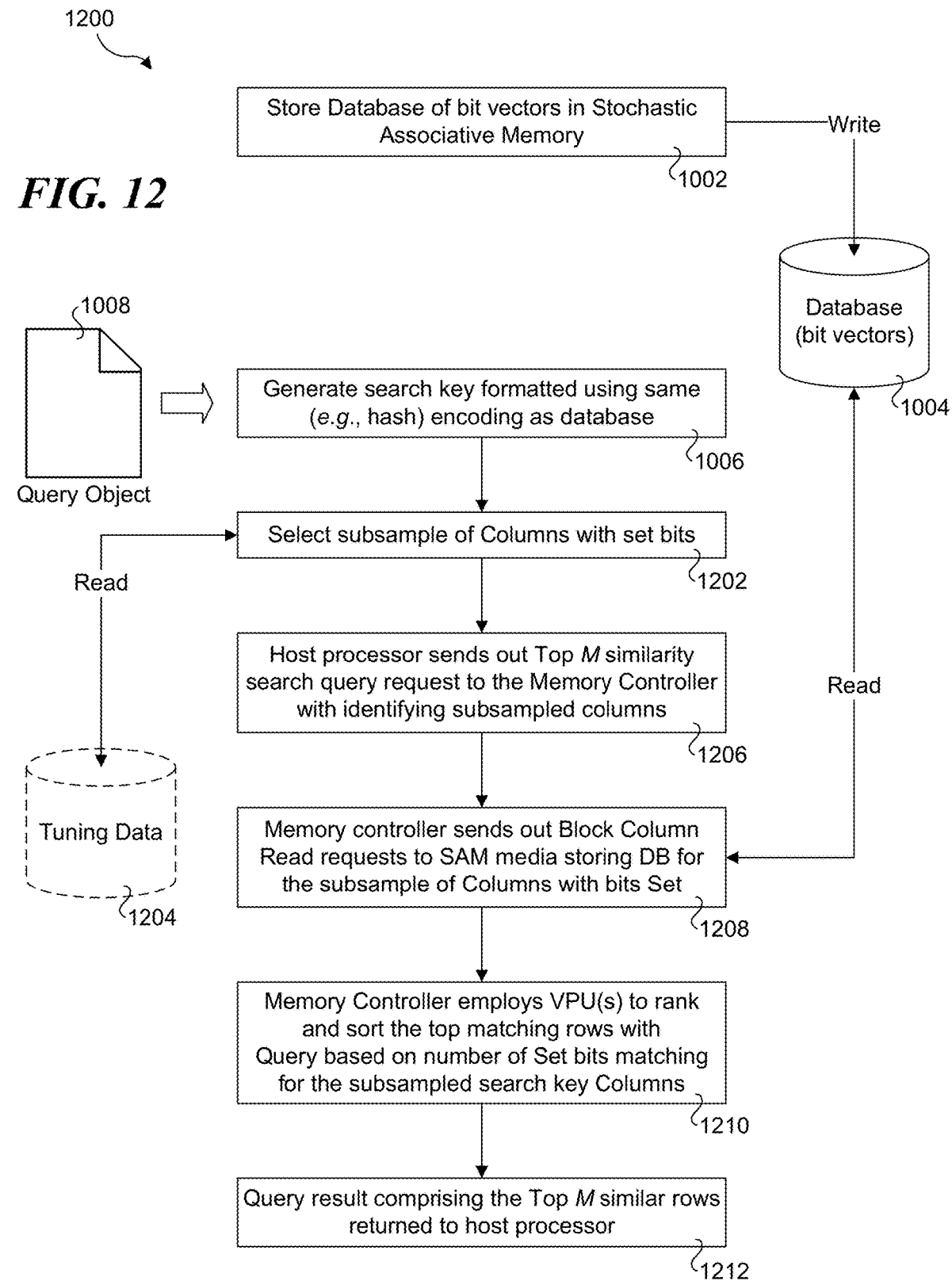
FIG. 12 is a flowchart illustrating an example subsampling process using a memory controller with one or more VPUs, according to one embodiment.

FIG. 12 shows a flowchart 1200 illustrating an example subsampling process using a memory controller with one or more VPUs, according to one embodiment. Under this example, the bit vectors data has been written to database 1004 in the SAM media using a predefined hash-based encoding technique implemented in block 1002. As before, query object 1008 is encoded using the same encoding as that used for the bit vectors in database 1004.

In a block 1202 a subsample of the columns with set bits in the search key are selected. In some embodiments, the subsampled columns (and/or fraction to be used) is selected using optional tuning data 1204. In a block 1206, the host processor sends out a top M similar search query request to the memory controller identifying the subsampled search key columns to be matched. In a block 1208 the memory controller sends out block column read requests to the SAM media used for storing database 1004 using the subsampled columns with their bits set. The memory controller then employs its one or more VPUs to rank and sort the top matching rows for the query based on the number of set bits matching the subsampled search key columns, as shown in a block 1210. The query result comprising the top M similar rows are then returned to the host processor in a block 1212.

Figure 13:
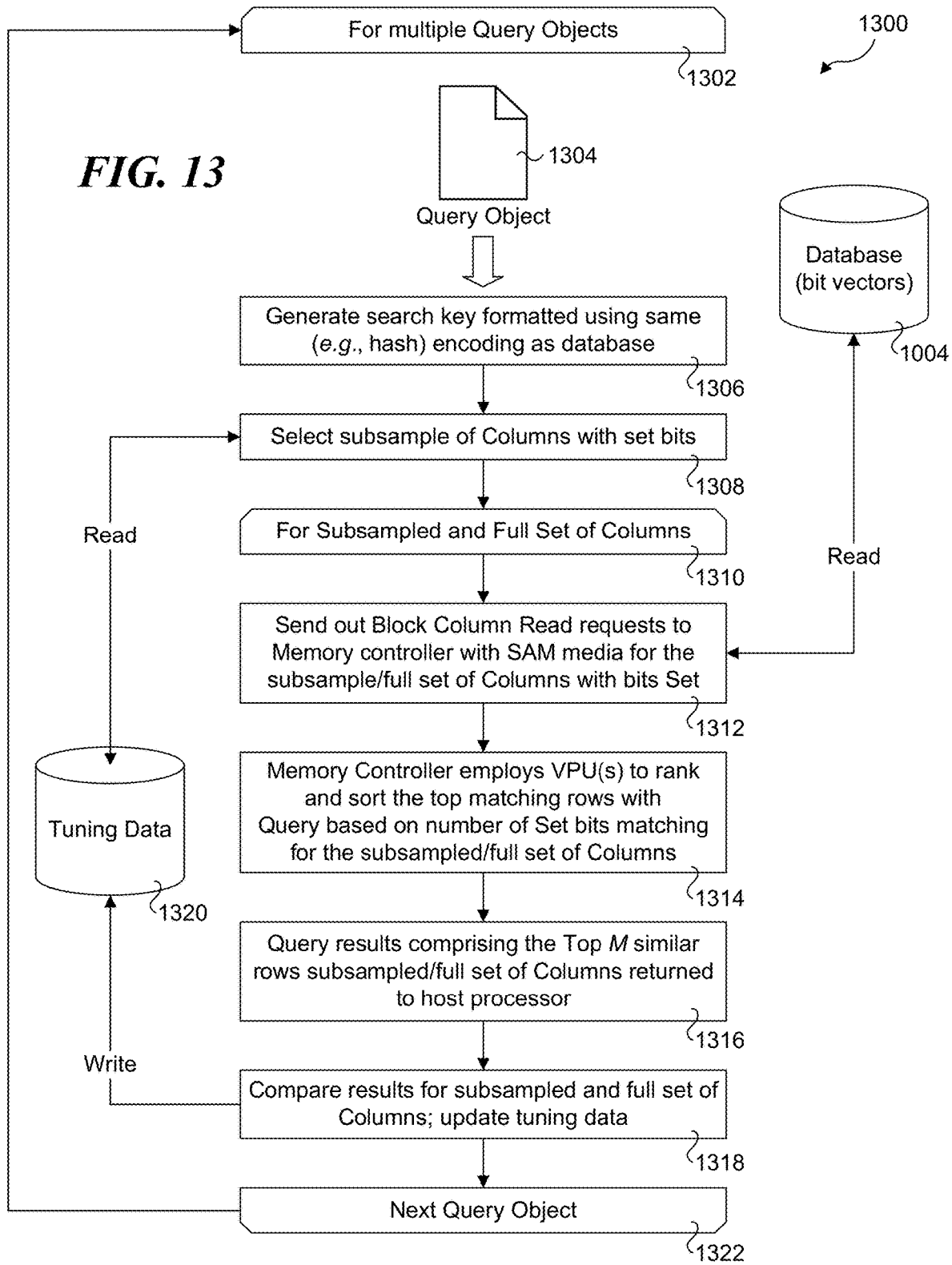
FIG. 13 is a flowchart illustrating operations for generating tuning data using query objects, according to one embodiment.

FIG. 13 shows a flowchart 1300 illustrating operations for generating tuning data 1320, according to one embodiment. As shown by start and end loop block 1302 and 1322, the operations are performed for multiple query objects. As before, database 1004 contains bit vectors encoded using a predetermined hash-based scheme. The operations for each query object 1304 are as follows. Generally, the query object may be submitted by an application or the query objects may be retrieved from a data structure in memory.

In a block 1306, a search key is generated for query object 1304 using the same encoding as used in database 1004. In a block 1308, a subsample of columns with set bits for the search key are read from tuning data 1320. As depicted by a start loop block 1310, the operations of blocks 1312, 1314, 1316, and 1318 are performed for both the subsampled and full set of columns in the search key.

In block 1312, the host processor sends out block column read requests to the memory controller used with the SAM media for the subsample and full set of columns with bits set in the search key. In block 1314 the memory controller employs its VPU(s) to rank and sort the top matching rows with the query based on the number of set bits matching the subsampled/full set of columns. The query results comprising the top NO rows for the subsampled and full set of match columns are then returned to the host processor in block 1316. In block 1318, the results of the subsampled and full set of search key columns are compared. Based on the comparison, tuning data 1320 may be updated. The logic than proceeds to evaluate the next query object in a similar manner, as depicted by the return loop from end loop block 1322 to start loop block 1302.

Figure 13A:
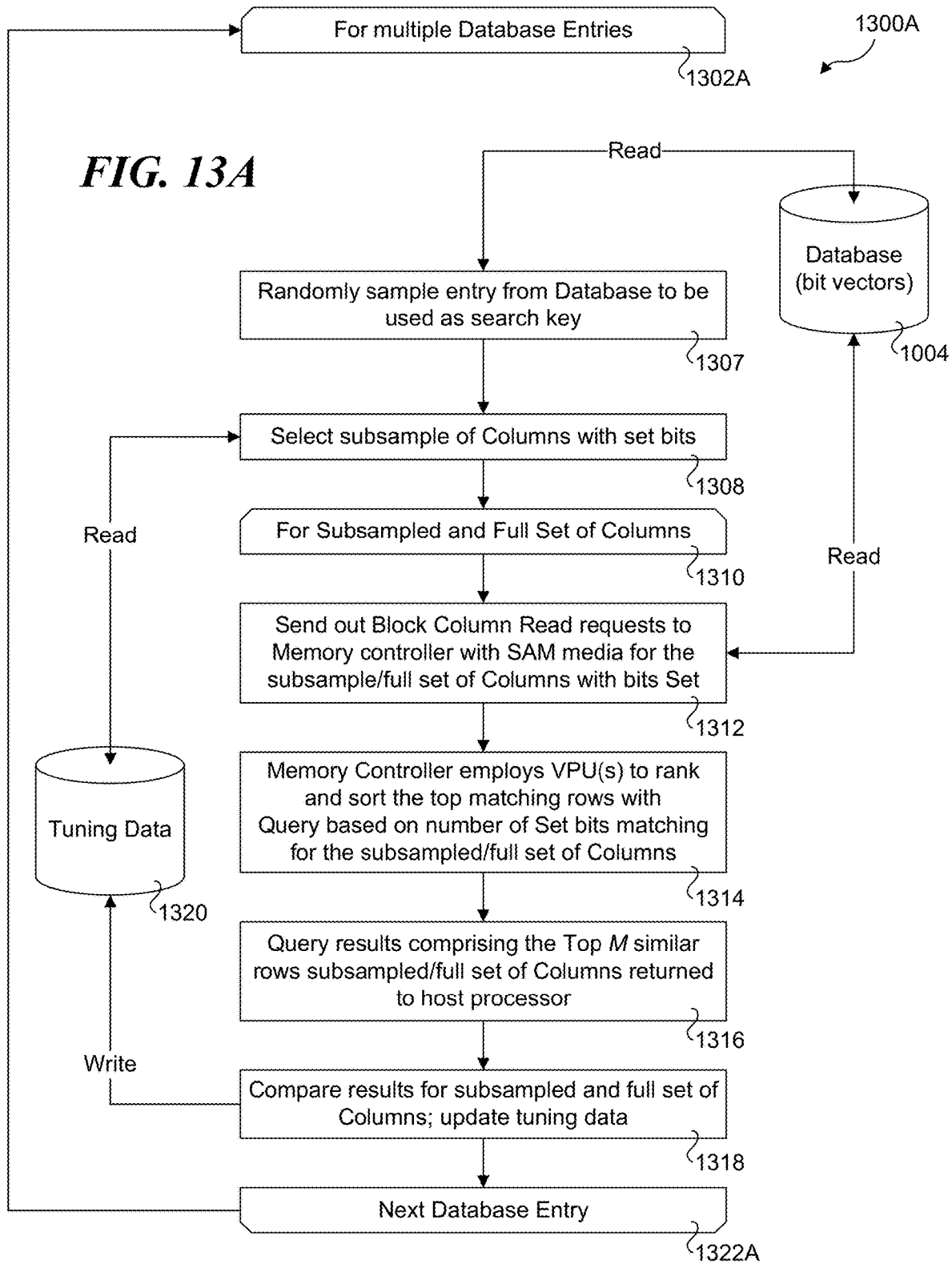
FIG. 13A is a flowchart shows an alternative tuning scheme under which entries in a database are used for search keys in lieu of using query objects, according to one embodiment.

Flowchart 1300A in FIG. 13A shows an alternative tuning scheme under which entries in database 1004 are used for search keys in lieu of using query objects 1304 and generating search keys in block 1306. Generally, the operations with like reference numbers in flowcharts 1300 and 1300A are the same, with the differences being in start and end loop blocks 1302A and 1322A and in a new block 1307 in which a sample from database 1004 is randomly selected.

Generally, the operations shown in flowcharts 1300 and 1300A may be used to tune the subsampling scheme to provide data that may be employed for selecting a desired throughput vs. accuracy loss tradeoff. For example, such data may be obtained by evaluating the same or similar search objects using different subsampling schemes and/or fractions.

Figure 14:
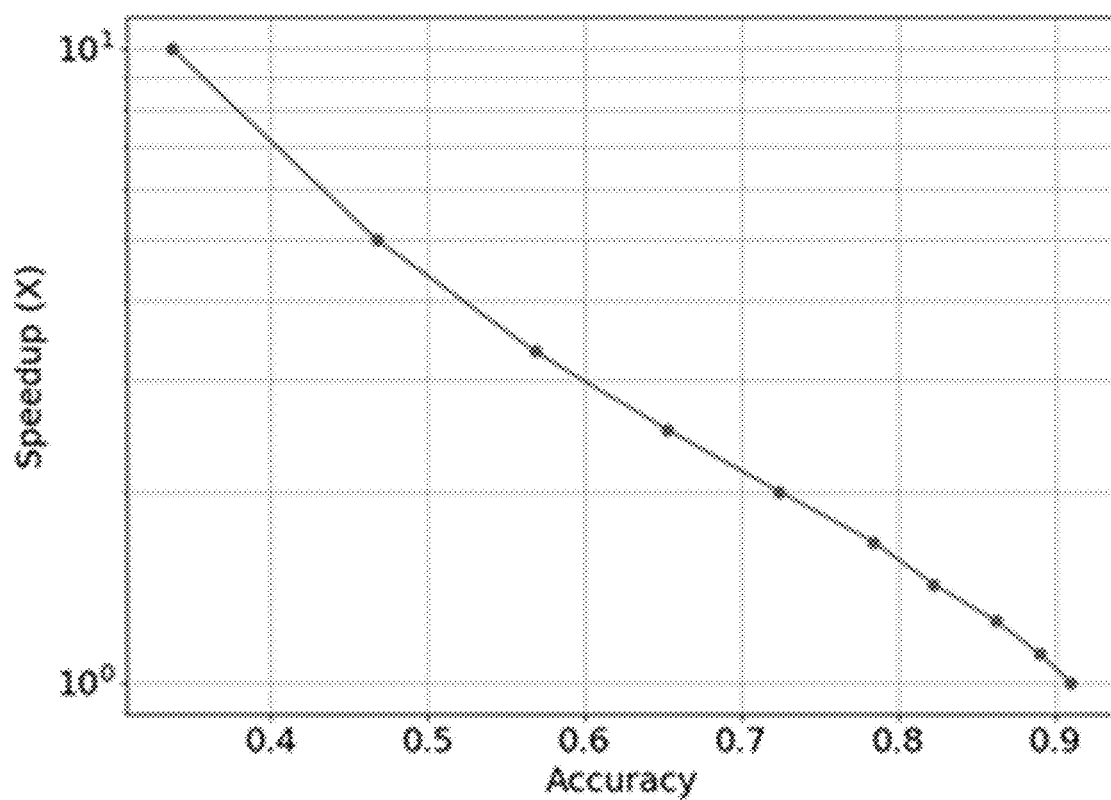
FIG. 14 is a graph illustrating the simulated speedup and accuracy tradeoff for the SIFT1M dataset when using the subsampling scheme.

The exact degree to which accuracy will drop depends on the nature of the underlying data, as well as the encoding scheme chosen to convert the data to bit vectors. FIG. 14 shows the simulated speedup and accuracy tradeoff for the SIFT1M dataset, with the given image encoding scheme described above. Note that we can get 2× throughput at the cost of ~16% reduction in search accuracy. Under some use cases, some initial data characterization may be used to choose the right tradeoff between the degree of subsampling and accuracy/throughput values needed.

Continuous Column Read

Another approach for similarity search tuning that does not rely on prior characterization of the dataset is using continuous column read and scoring. This approach involves continuously scoring the rows (counting the number of set bits) in an iterative manner as data from new column reads are completed to update cumulative scores doe the read columns. As before, the columns that are read are the columns with set bits in the search key bit vector. After each new column read, a rank correlation between the Nth column read cumulative scores and the Nth-1 column read cumulative scores is also calculated (e.g., using Spearman's rho or Kendall's tau, or another rank correlation algorithm or function). If the rank correlation between the Nth and Nth-1 cumulative scores is greater than a threshold (e.g., a threshold of 99% works well in practice) then reading further columns is stopped and the search is performed using the score at the Nth iteration.

This method utilizes two fundamental properties of the algorithm: first, the row ranks after completing the column reads are used in order to find the nearest neighbors; and second, the rank correlation of scores at consequent iterations provides a measure of when these rankings have stabilized. Therefore, we can reliably use rank correlation as a means of identifying when extra column read stop providing significant extra information about the row ranks.

Figure 15:
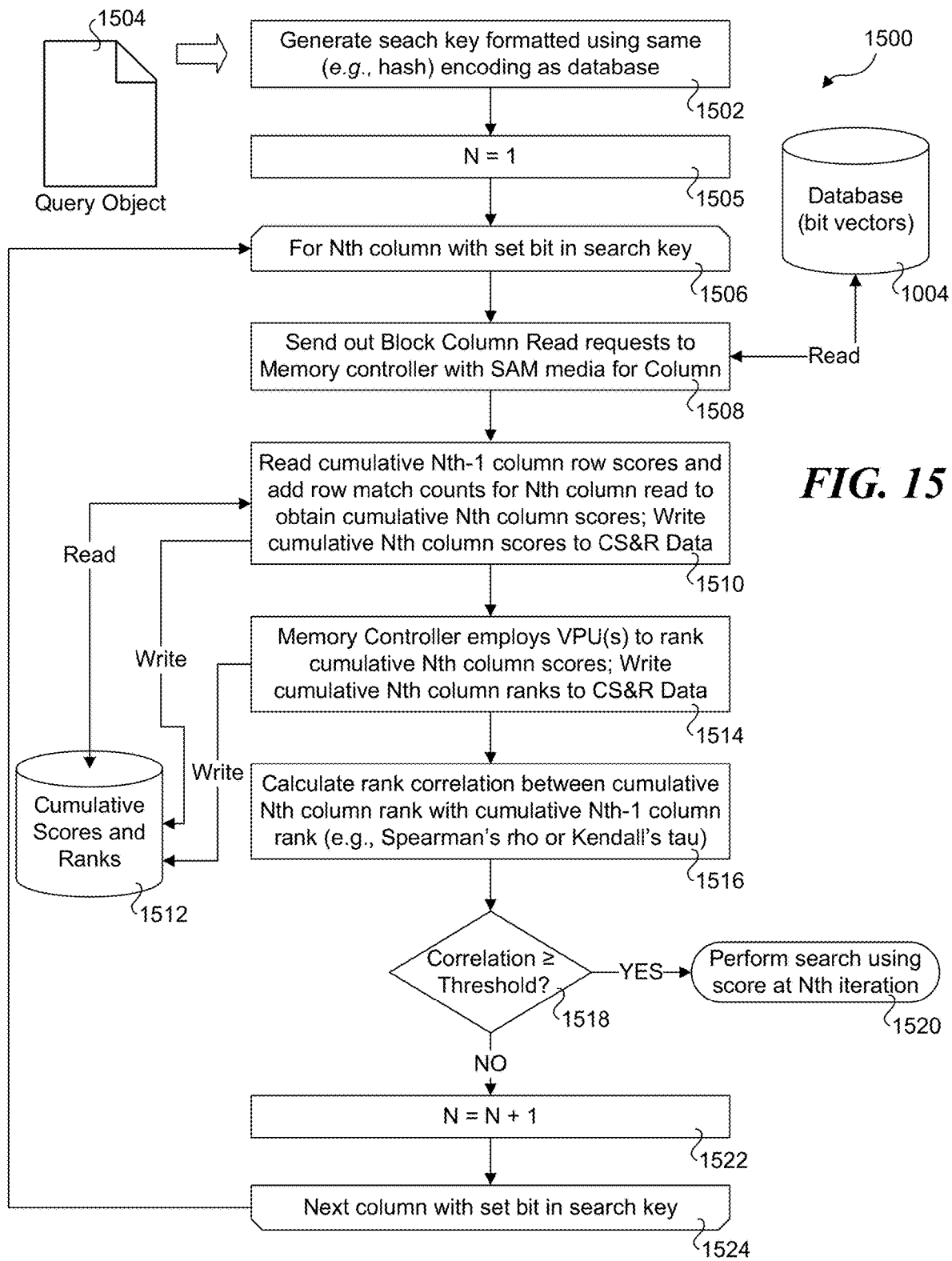
FIG. 15 is a flowchart illustrating operations performed by one embodiment of the continuous column read approach.

A flowchart 1500 illustrating operations performed by one embodiment of the continuous column read approach is shown in FIG. 15. As before, bit vectors that have been previously stored in the SAM media employed for database 1004 comprise the search space.

The process begins in a block 1502 in which a search key is generated for a query object 1504 using the same encoding scheme used for the bit vectors in database 1004. In a block 1505, N, which represents the iteration number, is set to 1 for the first iteration. As mentioned above, N does not correspond to the column number, but rather corresponds to a current column with a set bit in the search key bit vector. As depicted by start and end loop blocks 1506 and 1524, the operations within the loop are performed for respective new columns in an iterative manner. In one embodiment, the process begins at the first column. Alternatively, the process may begin at a column other than the first column (in which case N would be set to that other column number in block 1505.

In a block 1508, block column read requests are sent out to the memory controller with the SAM media for the current (Nth) column in database 1004. For example, for search key 1100 in FIG. 11A this would correspond to the third column. The column data are returned by the memory controller to the requester. In one embodiment the requester comprises an application executed on one or more processing elements such as a processor core, embedded processor, GPU, or VPU.

In a block 1510 the cumulative Nth-1 column row scores are read from cumulative scores and ranks (CS&R) data 1512 and the row match counts for Nth column read are added to obtain cumulative Nth column scores. The cumulative Nth column scores are then written to CS&R data 1512. During the first iteration, the operations in block 1510 will add the scores (set bit counts) for only the first column with the set bit in the search key, as no previous column exists at this time.

In a block 1514 the memory controller employs its VPU(s) to rank the cumulative Nth column scores and writes the results to CS&R data 1514. In a block 1516 a rank correlation between the cumulative Nth column rank and the cumulative Nth-1 column ranks is performed using a correlation function such as Spearman's rho or Kendall's tau. For the first iteration block 1516 is skipped as there is no prior cumulative column rank to correlate to. In some embodiments the top K ranks for the cumulative Nth and Nth-1 scores are used. For example, for a large search space on the order of billions of records it may be computationally expensive to rank and correlate all the records. Accordingly, in one embodiment only the top K ranks are used. Since the top K ranks may change during early iterations, a higher value may be used for these early iterations and subsequently replaced by K. In some embodiments, the operations in block 1516 are skipped for the first few iterations since it is likely a correlation threshold will not be reached during these early iterations. Under another approach, data for a block or set of blocks is used rather than the entire dataset.

As depicted by a decision block 1518, a determination is made whether the rank correlation meets or exceeds a threshold. If the answer is YES, the logic exits the loop and performs the search using the score at the Nth iteration, as depicted by an end block 1520. If the answer to decision block 1518 is NO, the logic proceeds to a block 1522 in which N is incremented by 1. As shown by end loop block 1524, the logic proceeds to evaluation the next column with a bit set in the search key by looping back to start loop block 1506.

The foregoing logic is iteratively performed until the rank correlation meets or exceeds the threshold, as determined in decision block 1518. The effect of the logic is the columns with set bits are continuously read from an initial starting point (e.g., first set bit column) to the right until the threshold is reached, wherein the cumulative rank results for the current column are compared with the immediately preceding cumulative rank results for the immediately preceding column to evaluate the rank correlation.

Figure 16:
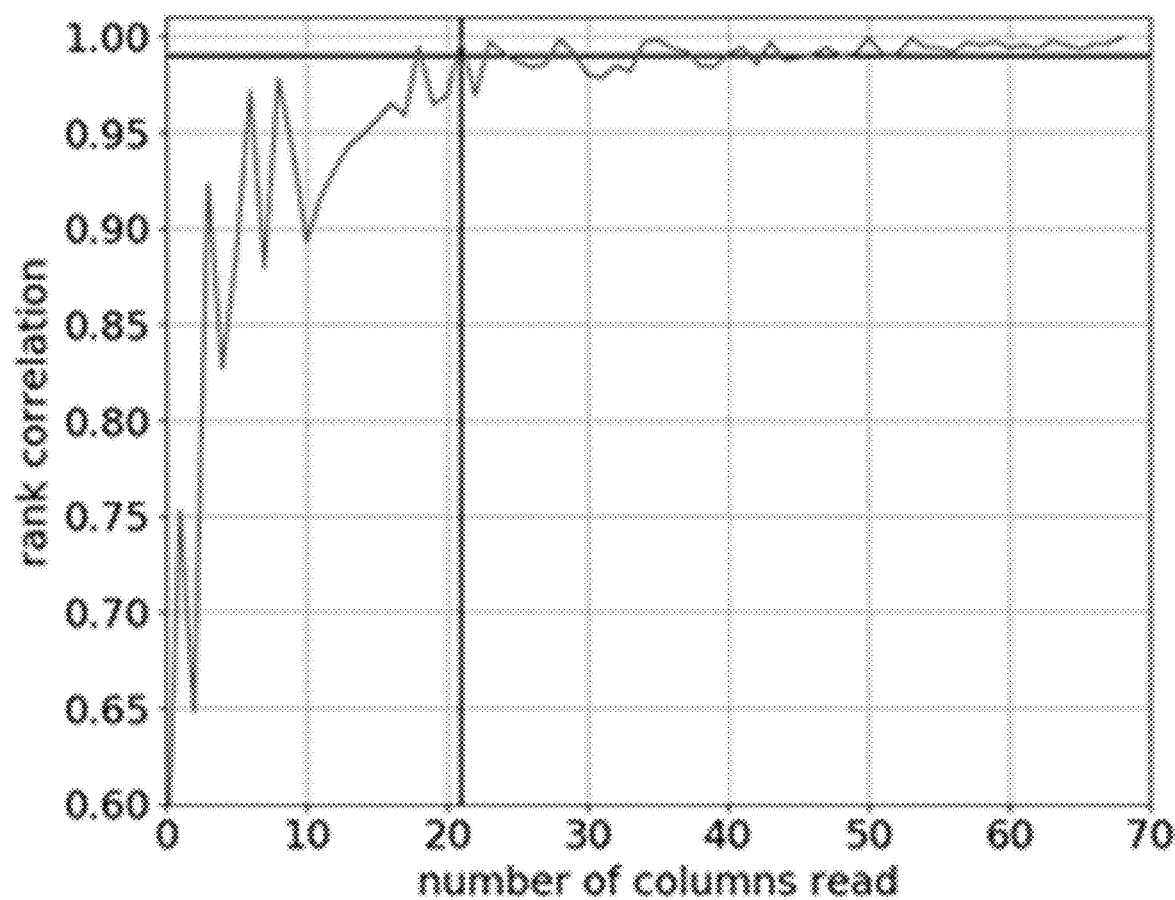
FIG. 16 is a graph illustrating rank correlations of when using continuous column read applied to an example dataset.

FIG. 16 shows a graph illustrating rank correlations of the current scores with the previous scores when using continuous column read applied to an example dataset. A state of saturation is reached at 21 column reads, at which point the rankings are stabilized. This graph demonstrates that the rank correlation does not significantly differ after many more columns (e.g., 60 or 70 columns), and thus using the ranks after 21 columns have been processed will lead to an outcome having a favorable speedup vs. accuracy tradeoff.

Figure 17:
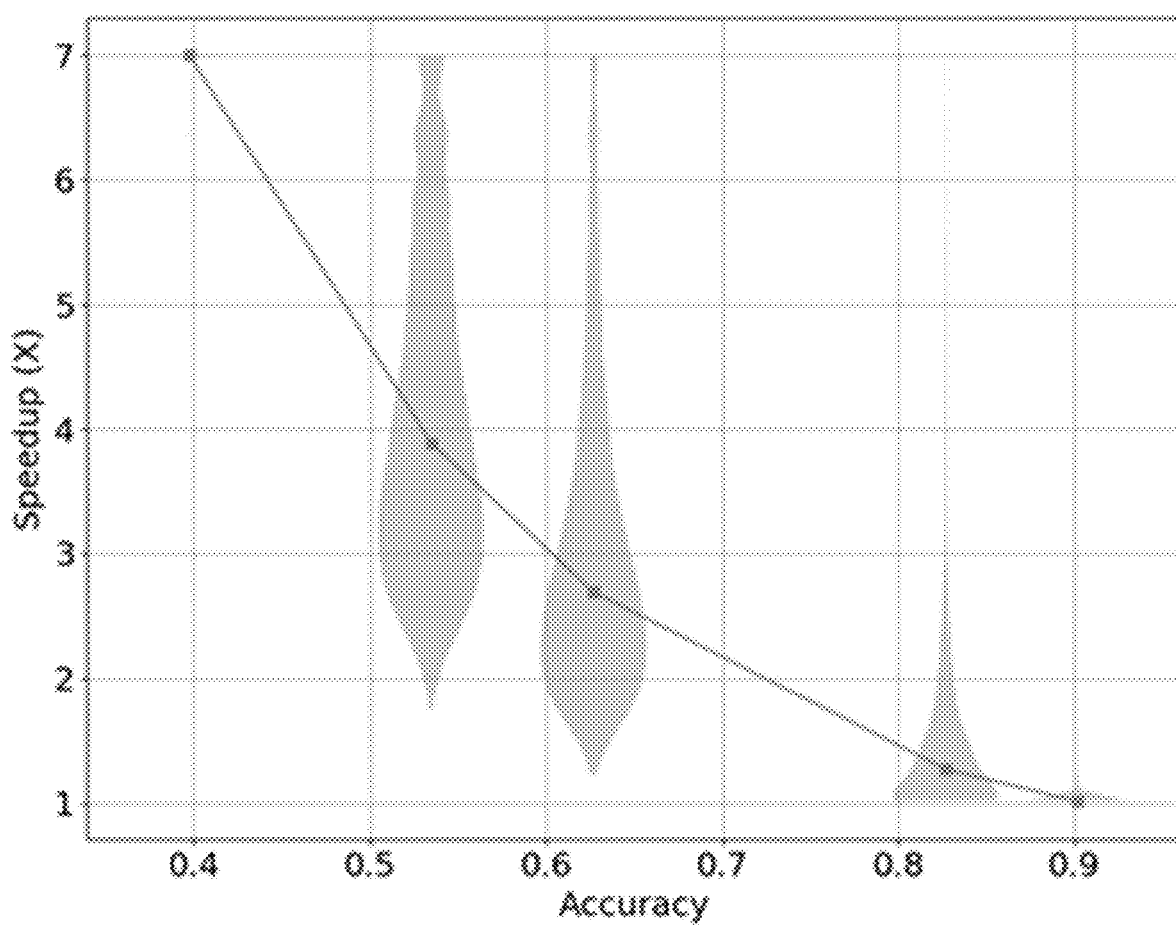
FIG. 17 is a violin plot illustrating tradeoffs between speedup and accuracy for the SIFT1M dataset.

As with the column subsampling technique, the speedup vs. accuracy tradeoff will depend on the nature of the dataset and the encodings used. FIG. 17 shows the results for the SIFT1M dataset with the encoding described herein. The dots represent median speedup, and the distributions of speedup are shown in the "violin" shapes. Note that the speedup is different for each query.

As discussed above, the teaching and principles disclosed herein may be applied to a variety of dataset encoded using sparse bit vectors. This includes both data encoded using hashing schemes, and various types of data encoded using other, non-hashing schemes. For example, the use of "one-hot" encoding or variants of one-hot encoding are commonly used in machine learning applications for categorical datasets. Under a categorical dataset, the "features" are the categories, and one-hot encoding is used to encode category values into a binarized format comprising sparse bit vectors. The bit vectors have a length (dimensionality) equal to the summation of the categorical values across all the categories, noting that some approaches may bucketize categorial values to reduce the dimensionality of the encoded bit vectors.

Using the column subsampling and continuous column read approaches disclosed herein may provide dramatic performance improvements relative to current deep learning algorithms/frameworks (e.g., TensorFlow/Keras, PyTorch, Caffe, MXNet), gradient boosted machines (e.g., XGBoost, Light GBM, CatBoost), support vector machines (SVM) and nearest neighbor algorithms. The availability of column reads is a game-changer, as calculating similarity scores using these conventional ML algorithms is incredibly math and memory access intensive. Moreover, the principles and techniques disclosed herein can be applied to very large datasets (on the order of billions of records having dimensionalities in the 100's or 1000's or even more). Under current ML approaches, such very large datasets generally require processing use of distributed resources.

As noted above, additional processing may be employed to further refine the top M or top K rows to find the nearest and/or exact matches. The additional processing may generally employ one or more ML frameworks and/or algorithms suitable for the dataset or other techniques.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Italicized letters, such as 'm', 's', 'K', 'M', etc., and capitalized letters such as 'N' in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software or firmware running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An apparatus, comprising:
   row and column addressable memory media having plurality of rows and columns of memory cells;
   circuitry connected to the memory media, wherein the circuitry is to:
      receive a plurality of sparse binary bit vectors, each comprising a sequence of binary bits;
      write the plurality of sparse binary bit vectors to respective rows in the memory media, wherein the sequence of binary bits for a sparse binary bit vector are written to a respective sequence of contiguous columns;
      receive or retrieve a search key comprising a bit vector having a plurality of m set bits;
      for a subset s of the m set bits,
         perform column-wise reads of the memory media for columns associated with the subset s of set bits to obtain a first plurality of vertical bit vectors, each vertical bit vector associated with a respective column and comprising a sequence of binary data having bit positions associated with respective contiguous rows;
         aggregate set bits in the first plurality of vertical bit vectors on a row-wise basis to calculate similarity scores for a plurality of rows; and
         rank the similarity scores.

2. The apparatus of claim 1, wherein the similarity scores that are ranked comprise similarity scores for the subset s of set bits, and wherein the circuitry is further to:
   for the m set bits,
      perform column-wise reads of the memory media for columns associated with the m set bits to obtain a second plurality of vertical bit vectors;
      aggregate set bits in the second plurality of vertical bit vectors on a row-wise basis to calculate similarity scores for the plurality of rows;
      rank the similarity scores to obtain a ranking for the m set bits; and
   compare the ranking for the subset s of set bits to the ranking for the m set bits.

3. The apparatus of claim 1, wherein the circuitry connected to the memory media includes a vector function unit (VFU), and wherein the operations of aggregating set bits in the first plurality of vertical bit vectors and ranking the similarity scores are performed by the VFU.

4. The apparatus of claim 1, wherein the subsets comprises a sequence of columns with set bits in the search key and wherein the ranking of similarity scores comprises a ranking for an Nth-1 iteration, and wherein the circuitry is further to:
   perform operations for an Nth iteration including,
      a) perform a column-wise read of the memory media for a next column with a set bit in the search key following a last column used for the Nth-1 iteration to obtain an Nth vertical bit vector;
      b) add set bits in the Nth vertical bit vector on a row-wise basis to the similarity scores calculated for the Nth-1 iteration to obtain similarity scores for the Nth iteration;
      c) rank the similarity scores for the Nth iteration; and
      d) calculate a rank correlation between rankings of the similarity scores for the Nth and Nth-1 iterations; and
      e) determine whether the rank correlation meets or exceeds a threshold;
      when the rank correlation meets or exceeds the threshold,
         at least one of return and store indicia identifying rows with a top M similarity scores for the Nth iteration; otherwise,
      increment N and repeating operations a)-e) for a next iteration,
   wherein the foregoing operations are performed in an iterative manner until the rank correlation meets or exceeds the threshold.

5. The apparatus of claim 1, wherein the memory media comprises stochastic associative memory (SAM) media having similar read latencies for columns and rows.

6. The apparatus of claim 1, wherein the memory media comprises three-dimensional cross-point memory.

7. The apparatus of claim 1, wherein the apparatus comprises a data storage device.

8. A computing system comprising
a processor;
row and column addressable memory media having plurality of rows and columns of memory cells; and
circuitry connected to the memory media and operatively connected to the processor,
wherein the computing system is configured to:
store data comprising a plurality of sparse binary bit vectors in respective rows in the memory media, each sparse binary bit vector comprising a sequence of binary bits occupying a sequence of respective contiguous columns;
generate or receive a search key comprising a bit vector having a plurality of m set bits;
for a subset s of the m set bits,
perform column-wise reads of the memory media for columns associated with the subset s of set bits to obtain a first plurality of vertical bit vectors, each vertical bit vector associated with a respective column and comprising a sequence of binary data having bit positions associated with respective contiguous rows in the memory media;
aggregate set bits in the first plurality of vertical bit vectors on a row-wise basis to calculate similarity scores for a plurality of rows; and
rank the similarity scores.

9. The computing system of claim 8, wherein the similarity scores that are ranked comprise similarity scores for the subset s of set bits, and wherein the computing system is further configured to:
for the m set bits,
perform column-wise reads of the memory media for columns associated with the m set bits to obtain a second plurality of vertical bit vectors;
aggregate set bits in the second plurality of vertical bit vectors on a row-wise basis to calculate similarity scores for the plurality of rows;
rank the similarity scores to obtain a ranking for the m set bits; and
compare the ranking for the subset s of set bits to the ranking for the m set bits.

10. The computing system of claim 8, wherein the circuitry connected to the memory media includes a vector function unit (VFU), and wherein the operations of aggregating set bits in the first plurality of vertical bit vectors and ranking the similarity scores are performed by the VFU.

11. The computing system of claim 8, wherein the subset s comprises a sequence of columns with set bits in the search key and wherein the ranking of similarity scores comprises a ranking for an Nth-1 iteration, and wherein the circuitry is further to:
perform operations for an Nth iteration including,
a) perform a column-wise read of the memory media for a next column with a set bit in the search key following a last column used for the Nth-1 iteration to obtain an Nth vertical bit vector;
b) add set bits in the Nth vertical bit vector on a row-wise basis to the similarity scores calculated for the Nth-1 iteration to obtain similarity scores for the Nth iteration;
c) rank the similarity scores for the Nth iteration; and
d) calculate a rank correlation between rankings of the similarity scores for the Nth and Nth-1 iterations; and
e) determine whether the rank correlation meets or exceeds a threshold;
when the rank correlation meets or exceeds the threshold,
at least one of return and store indicia identifying rows with a top M similarity scores for the Nth iteration; otherwise,
increment N and repeating operations a)-e) for a next iteration,
wherein the foregoing operations are performed in an iterative manner until the rank correlation meets or exceeds the threshold.

12. The computing system of claim 8, wherein the memory media comprises stochastic associative memory (SAM) media having similar read latencies for columns and rows.

13. A method for performing a similarity search of a dataset encoded as a plurality of sparse binary bit vectors written to respective contiguous rows in memory media supporting column-wise reads, comprising:
generating or receiving a search key comprising a bit vector having a plurality of m set bits;
for a subset s of the m set bits,
performing column-wise reads of the memory media for columns associated with the subset s of set bits to obtain a first plurality of vertical bit vectors, each vertical bit vector associated with a respective column and comprising a sequence of binary data having bit positions associated with respective contiguous rows;
aggregating set bits in the first plurality of vertical bit vectors on a row-wise basis to calculate similarity scores for a plurality of rows; and
ranking the similarity scores.

14. The method of claim 13, wherein the subset s of set bits is obtained by subsampling the m set bits in the search key.

15. The method of claim 13, further comprising:
determining a top N similarity scores; and
at least one of returning and storing indicia identifying rows with the top N similarity scores.

16. The method of claim 13, wherein the similarity scores that are ranked comprise similarity scores for the subset s of set bits, further comprising:
for the m set bits,
performing column-wise reads of the memory media for columns associated with the m set bits to obtain a second plurality of vertical bit vectors;
aggregating set bits in the second plurality of vertical bit vectors on a row-wise basis to calculate similarity scores for the plurality of rows;
ranking the similarity scores to obtain a ranking for the m set bits; and
comparing the ranking for the subset s of set bits to the ranking for the m set bits.

17. The method of claim 16, further comprising:
for each of a plurality of respective subsets s of the m set bits having different numbers of set bits;
performing column-wise reads of the memory media for columns associated with the subset s of set bits to obtain an associated plurality of vertical bit vectors,
aggregating set bits in the associated plurality of vertical bit vectors on a row-wise basis to calculate similarity scores for the plurality of rows; and
ranking the similarity scores for the respective subset s; and comparing the ranking for the respective subsets s of set bits to the ranking for the m set bits to obtain data for tuning the similarity search.

18. The method of claim 13, wherein the operations of aggregating set bits in the first plurality of vertical bit vectors and ranking the similarity scores are performed by a vector function unit in a memory device or storage device comprising the memory media.

19. The method of claim 13, wherein the subsets comprises a sequence of columns with set bits in the search key and wherein the ranking of similarity scores comprises a ranking for an Nth-1 iteration, further comprising:

performing operations for an Nth iteration including,
   a) performing a column-wise read of the memory media for a next column with a set bit in the search key following a last column used for the Nth-1 iteration to obtain an Nth vertical bit vector;
   b) adding set bits in the Nth vertical bit vector on a row-wise basis to the similarity scores calculated for the Nth-1 iteration to obtain similarity scores for the Nth iteration;
   c) ranking the similarity scores for the Nth iteration; and
   d) calculating a rank correlation between rankings of the similarity scores for the Nth and Nth-1 iterations; and
   e) determining whether the rank correlation meets or exceeds a threshold;
when the rank correlation meets or exceeds the threshold,
   at least one of returning and storing indicia identifying rows with a top M similarity scores for the Nth iteration; otherwise,
incrementing N and repeating operations a)-e) for a next iteration,
wherein the method operations are performed in an iterative manner until the rank correlation meets or exceeds the threshold.

20. The method of claim 19, wherein the memory media comprises a plurality of blocks, and the method is performed using data associated with multiple blocks of the plurality of blocks, wherein the vertical bit vectors are generated by reading columns for the multiple blocks in parallel.

* * * * *

UNITED STATES PATENT AND TRADEMARK OFFICE
CERTIFICATE OF CORRECTION

PATENT NO. : 11,500,887 B2
APPLICATION NO. : 17/227045
DATED : November 15, 2022
INVENTOR(S) : Sourabh Dongaonkar et al.

It is certified that error appears in the above-identified patent and that said Letters Patent is hereby corrected as shown below:

In the Claims

Claim 4 change:
"The apparatus of claim 1, wherein the subsets comprises a sequence"
To:
The apparatus of claim 1, wherein the subset s comprises a sequence Signed and Sealed this
Thirty-first Day of January, 2023

Katherine Kelly Vidal
*Director of the United States Patent and Trademark Office*